(12) United States Patent
Kogure

(10) Patent No.: US 7,460,447 B2
(45) Date of Patent: Dec. 2, 2008

(54) TILT DETECTION APPARATUS, HOLOGRAM APPARATUS, TILT CORRECTION METHOD FOR MEDIUM, AND TILT CORRECTION METHOD FOR HOLOGRAM MEDIUM

(75) Inventor: Kazuya Kogure, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 192 days.

(21) Appl. No.: 11/303,806

(22) Filed: Dec. 15, 2005

(65) Prior Publication Data
US 2006/0133249 A1 Jun. 22, 2006

(30) Foreign Application Priority Data
Dec. 21, 2004 (JP) ............................. 2004-370018

(51) Int. Cl.
G11B 5/09 (2006.01)
G11B 7/00 (2006.01)
G11B 11/00 (2006.01)
G11B 15/62 (2006.01)
G11B 17/32 (2006.01)
G11B 20/18 (2006.01)
G11B 27/36 (2006.01)

(52) U.S. Cl. ................... 369/44.32; 369/53.19

(58) Field of Classification Search ............... 359/1, 359/22, 32; 369/44.32, 53.19, 103
See application file for complete search history.

(56) References Cited

U.S. PATENT DOCUMENTS
6,545,958 B1 * 4/2003 Hirai et al. ............... 369/44.32
7,116,626 B1 * 10/2006 Woods et al. ............... 369/103
2004/0037196 A1 * 2/2004 Matsumoto et al. ...... 369/53.19

FOREIGN PATENT DOCUMENTS
JP 2002-216359 8/2002
JP 2004-158114 6/2004
JP 2004-177958 6/2004
JP 2004-272268 9/2004

* cited by examiner

Primary Examiner—Alessandro Amari
(74) Attorney, Agent, or Firm—SoCal IP Law Group LLP; Steven C. Sereboff; John E. Gunther

(57) ABSTRACT

A tilt detection apparatus for a medium comprises a tilt detection beam generator that makes a tilt detection beam incident ion a medium to detect whether the medium is tilted with respect to a reference position; a light reception unit that receives the tilt detection beam that after striking the medium, has come from the medium; and a correction output unit that outputs a signal to correct a tilt of the medium, based on a difference in light reception position on the light reception unit between a position at which the light reception unit receives the tilt detection beam and a position at which the light reception unit is to receive the tilt detection beam when the medium is in the reference position.

13 Claims, 11 Drawing Sheets

TILT DETECTION APPARATUS, HOLOGRAM
APPARATUS, TILT CORRECTION METHOD
FOR MEDIUM, AND TILT CORRECTION
METHOD FOR HOLOGRAM MEDIUM

CROSS-REFERENCE TO RELATED
APPLICATIONS

The present application claims priority from Japanese Patent Application No. 2004-370018 filed on Dec. 21, 2004, which is herein incorporated by reference.

BACKGROUND OF THE INVENTION

1. Field of the Invention

The present invention relates to a tilt detection apparatus, a hologram apparatus, a tilt correction method for a medium, and a tilt correction method for a hologram medium.

2. Description of the Related Art

Among hologram media adapted to record digital data as holograms is a photosensitive resin (e.g., photopolymer) sealed between glass substrates.

To record digital data on a hologram medium as a hologram, a laser beam from a laser device is first split into two beams by a PBS (Polarization Beam Splitter). Then, one of the two beams (hereinafter referred to as reference beam) and a laser beam (hereinafter referred to as data beam) produced by the other beam irradiating an SLM (Spatial Light Modulator) having digital data in the form of a two-dimensional contrast image pattern, which beam reflects information of the two-dimensional contrast image pattern, are irradiated onto a hologram medium at a given angle, and thereby the digital data is recorded onto the hologram medium.

More specifically, the photosensitive resin making up the hologram medium has a finite number of monomers. When the laser beam (hereinafter referred to as laser beam) made up of the reference and data beams is irradiated thereonto, the monomers change into polymers correspondingly with the energy determined by the light intensity of the laser beam and the irradiation time. As a result of the transformation of the monomers into polymers, interference fringes, made up of polymers, are formed correspondingly with the laser beam energy. Therefore, as a result of the formation of such interference fringes in the hologram medium, digital data is recorded as a hologram. Later, remaining monomers migrate (diffuse) to those locations that have had monomers consumed. Further, by irradiating the laser beams again, changes of such monomers into polymers are iterated. FIG. 2 schematically illustrates how monomers transform into polymers in response to the laser beam energy in the hologram medium.

When there is a large amount of digital data to be recorded in the hologram medium, so-called angle-multiplexed recording may be performed which forms a number of holograms by varying the incidence angle of the reference beam onto the hologram medium. For example, a hologram formed on the hologram medium is called a page, whereas a multiplexed hologram made up of a number of pages is called a book. FIG. 3 schematically illustrates a book and pages in the angle-multiplexed recording. As shown in FIG. 3, for a single book in the angle-multiplexed recording, e.g., ten pages of holograms are formed by varying the incidence angle of the reference beam. Thus, the recording of digital data onto a hologram medium by the angle-multiplexed recording allows for the recording of a large amount of digital data.

Meanwhile, to reproduce digital data from the hologram medium, the reference beam is irradiated onto the interference fringes representing the digital data at the same incidence angle as when the interference fringes were formed, and the reference beam diffracted by the interference fringe (hereinafter referred to as reproduction beam) is received by an image sensor or other means. The reproduction beam received by the image sensor or other means produces a two-dimensional contrast image pattern representing the above-mentioned digital data. Then, the digital data can be reproduced by demodulating this two-dimensional contrast image pattern by a decoder or other means.

As such, when digital data is reproduced from a hologram medium, a two-dimensional contrast image pattern is reproduced from the reproduction beam. Hence, the reproduction beam at an image sensor or other means must have a light intensity equal to or above a given level to allow the reproduction of the two-dimensional contrast image pattern. To have the reproduction beam have at least the given level of light intensity, therefore, the interference fringes diffracting the reference beam must have a specified or higher value of diffraction efficiency, which indicates the ratio of the reproduction beam light intensity to that of the incident reference beam. It is to be noted that the specified value of diffraction efficiency is such a value that the reproduction beam has the given level of light intensity.

FIG. 4 is a diagram showing an incidence angle θ between the reference beam (hereinafter called a recording reference beam) and the data beam when forming the interference fringes in a hologram medium. FIG. 5 is a diagram showing an angle θ between a reference beam (hereinafter called a reproducing reference beam) and the reproduction beam (hereinafter called a reproducing angle θ) when reproducing digital data from the interference fringes of FIG. 4.

When reproducing digital data from the hologram medium, letting Δθ, n, t, and λ be the angle difference between the incidence angle θ and the reproducing angle θ, the refraction index of the hologram medium, the thickness of the hologram medium, and the wavelength of the laser beam emitted from a laser device respectively, Δθ is expressed as $(\lambda \times \sqrt{(n^2-\sin^2\theta)})/t \times \sin\theta \times \cos\theta$. If $n=1$ and $\sin\theta=1$, then $\Delta\theta=\lambda/t$, which is found to be no greater than the wavelength of the laser beam. If the laser beam is, e.g., a helium neon laser, its wavelength λ is 633 nm, and Δθ is very small. As a result, it is understood that the reproducing angle θ for reproducing digital data from the hologram medium needs to be within such an angle difference Δθ of the incidence angle θ for when the interference fringes representing the digital data are formed. That is, the reproducing reference beam needs to be incident on the hologram medium at a very accurate reproducing angle θ. And the hologram medium needs to be placed in such a position (hereinafter called a reference position) that the reproducing reference beam is made incident thereon at the very accurate reproducing angle θ.

Meanwhile, it is required for the sake of convenience, flexibility, and the like that the hologram medium is configured to be attachable to and detachable from a hologram apparatus able to record or reproduce holograms. For example, when a hologram medium on which a hologram apparatus recorded digital data as a hologram is required to be played back by another hologram apparatus, if the hologram medium is attachable, the requirement can be easily fulfilled (refer to, e.g., Japanese Patent Application Laid-Open Publication Nos. 2004-177958 and 2004-272268).

However, in the case of an attachable hologram medium, the hologram medium may be tilted with respect to the above reference position depending on the mechanical configuration and the like of a body on which the hologram medium is mounted. The tilt of the hologram medium may cause the angle difference between the incidence angle θ and the reproducing angle θ to be greater than the angle difference Δθ thereby making the reproducing reference beam not be accurately incident and disabling the reproduction of digital data. Or, the reproducing reference beam is not accurately incident on a desired hologram but on another hologram, and false digital data may be reproduced. Also, when recording digital data onto the hologram medium, the digital data may not be recorded as a hologram at a desired position in the hologram medium.

In particular, where the hologram medium is shaped like a disk, since being thin, it is difficult to hold the hologram medium horizontal with respect to the reference position, and the hologram medium may be tilted. Moreover, the disk-shaped hologram medium, in order to make it attachable to a hologram apparatus, may be mechanically processed to have, e.g., a central opening therein. And the hologram apparatus is provided with a support that fits detachably the central opening and with a table to rotate hologram media to form a number of holograms. As a result, due to distortion that occurs in mounting hologram media on the hologram apparatus or centrifugal force exerted on the hologram media when rotating, the hologram media may be tilted with respect to the reference position.

SUMMARY OF THE INVENTION

Hence, an object of the present invention is to provide a tilt detection apparatus, a hologram apparatus, a tilt correction method for a medium, and a tilt correction method for a hologram medium, which can correct the tilt of a hologram medium tilted with respect to a reference position.

The present invention to solve the above and other problems is a tilt detection apparatus comprising a tilt detection beam generator that makes a tilt detection beam incident on a medium to detect whether the medium is tilted with respect to a reference position, a light reception unit that receives the tilt detection beam that after striking the medium, has come from the medium, and a correction output unit that outputs a signal to correct a tilt of the medium, based on a difference in light reception position on the light reception unit between a position at which the light reception unit receives the tilt detection beam and a position at which the light reception unit is to receive the tilt detection beam when the medium is in the reference position.

Furthermore, according to the present invention, there is provided a hologram apparatus which causes a coherent data beam corresponding to data to be recorded and a coherent recording reference beam to strike a hologram medium so as to record the data in the form of a hologram in the hologram medium, the hologram apparatus comprising a tilt detection beam generator that causes a tilt detection beam, incoherent to the data beam and the recording reference beam and to detect whether the hologram medium is tilted with respect to a reference position, to strike the hologram medium, a light reception unit that receives the tilt detection beam that after striking the medium, has come from the hologram medium, a correction output unit that outputs a signal to correct a tilt of the hologram medium, based on a difference in light reception position on the light reception unit between a position at which the light reception unit receives the tilt detection beam and a position at which the light reception unit is to receive the tilt detection beam when the medium is in the reference position, and a correction driver that corrects position of the hologram medium on the basis of the signal from the correction output unit.

Moreover, according to the present invention, there is provided a hologram apparatus which causes a coherent reproducing reference beam to strike a hologram medium in which data to be reproduced is recorded as a hologram and reproduces the data based on the reproducing reference beam that has been diffracted by the hologram, the hologram apparatus comprising a tilt detection beam generator that causes a tilt detection beam, incoherent to the reproducing reference beam and to detect whether the hologram medium is tilted with respect -to a reference position, to strike the hologram medium, a light reception unit that receives the tilt detection beam that after striking the medium, has come from the hologram medium, a correction output unit that outputs a signal to correct a tilt of the hologram medium, based on a difference in light reception position on the light reception unit between a position at which the light reception unit receives the tilt detection beam and a position at which the light reception unit is to receive the tilt detection beam when the medium is in the reference position, and a correction driver that corrects position of the hologram medium on the basis of the signal from the correction output unit.

Yet further, according to the present invention, there is provided a tilt correction method for a medium comprising making a tilt detection beam incident on a medium to detect whether the medium is tilted with respect to a reference position, receiving the tilt detection beam that after striking the medium, has come from the medium, and outputting a signal to correct a tilt of the medium, based on a difference in light reception position between a position at which the light reception unit receives the tilt detection beam and a position at which the light reception unit is to receive the tilt detection beam when the medium is in the reference position.

Still further, according to the present invention, there is provided a tilt correction method for a hologram medium by a hologram apparatus which causes a coherent data beam corresponding to data to be recorded and a coherent recording reference beam to strike a hologram medium so as to record the data in the form of a hologram in the hologram medium, the method comprising causing a tilt detection beam, incoherent to the data beam and the recording reference beam and to detect whether the hologram medium is tilted with respect to a reference position, to strike the hologram medium, receiving the tilt detection beam that after striking the medium, has come from the hologram medium, outputting a signal to correct a tilt of the hologram medium, based on a difference in light reception position between a position at which the light reception unit receives the tilt detection beam and a position at which the light reception unit is to receive the tilt detection beam when the hologram medium is in the reference position, and correcting position of the hologram medium on the basis of the signal.

Yet further, according to the present invention, there is provided a tilt correction method for a hologram medium by a hologram apparatus which causes a coherent reproducing reference beam to strike a hologram medium in which data to be reproduced is recorded as a hologram and reproduces the data based on the reproducing reference beam that has been diffracted by the hologram, the method comprising causing a tilt detection beam, incoherent to the reproducing reference beam and to detect whether the hologram medium is tilted with respect to a reference position, to strike the hologram medium, receiving the tilt detection beam that after striking the medium, has come from the hologram medium, outputting a signal to correct a tilt of the hologram medium, based on a difference in light reception position between a position at which the light reception unit receives the tilt detection beam and a position at which the light reception unit is to receive the tilt detection beam when the hologram medium is in the reference position, and correcting position of the hologram medium on the basis of the signal.

According to the present invention, there are provided a tilt detection apparatus, a hologram apparatus, a tilt correction method for a medium, and a tilt correction method for a hologram medium, which can correct the tilt of a hologram medium tilted with respect to a reference position.

Features and objects of the present invention other than the above will become apparent from the description of this specification and the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

<<Implementations>>

===Overall Configuration of Tilt Detection Apparatus/Hologram Apparatus===

Figure 1:
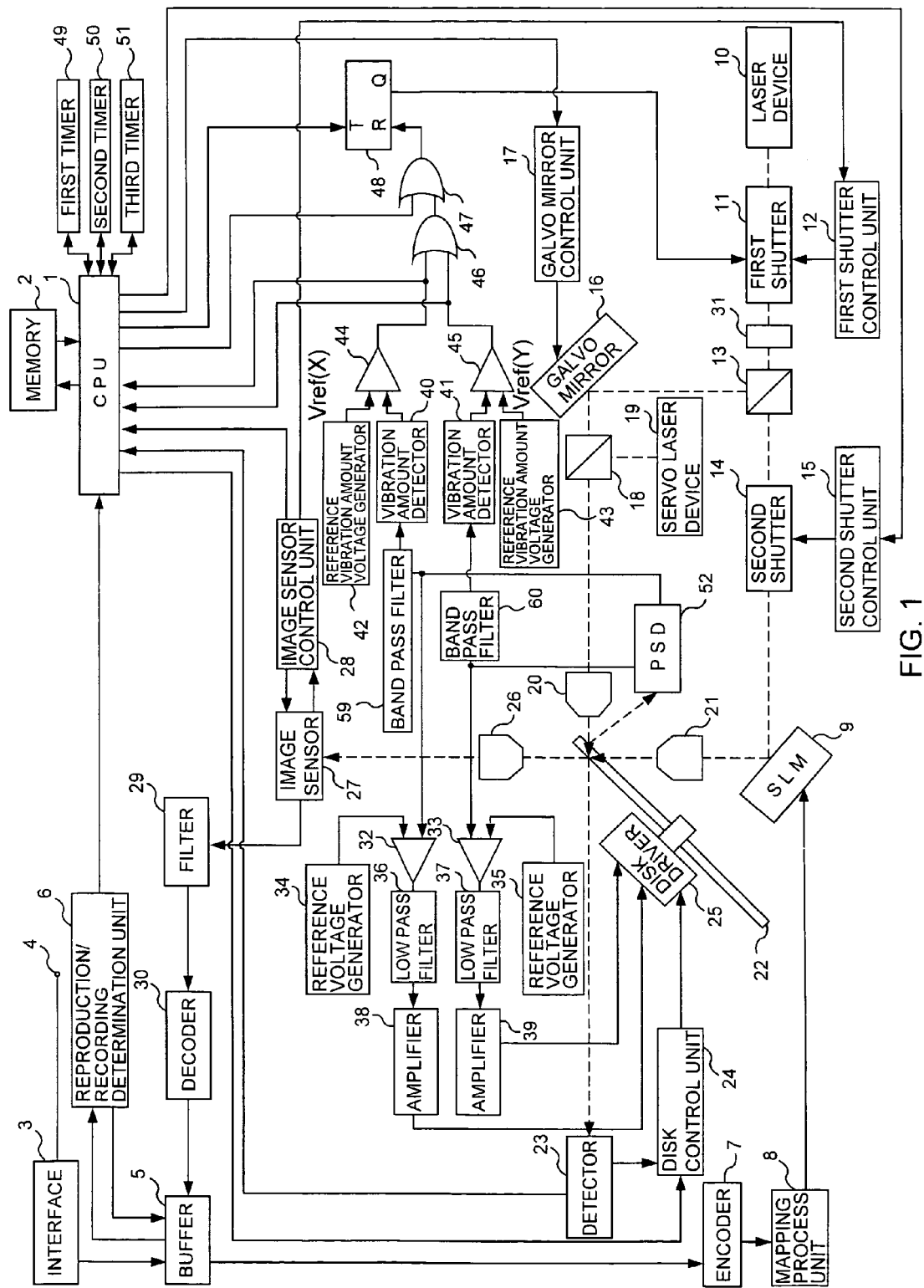
FIG. 1 illustrates an example of the overall configuration of a tilt detection apparatus/hologram apparatus according to the present invention.
Figure 2:
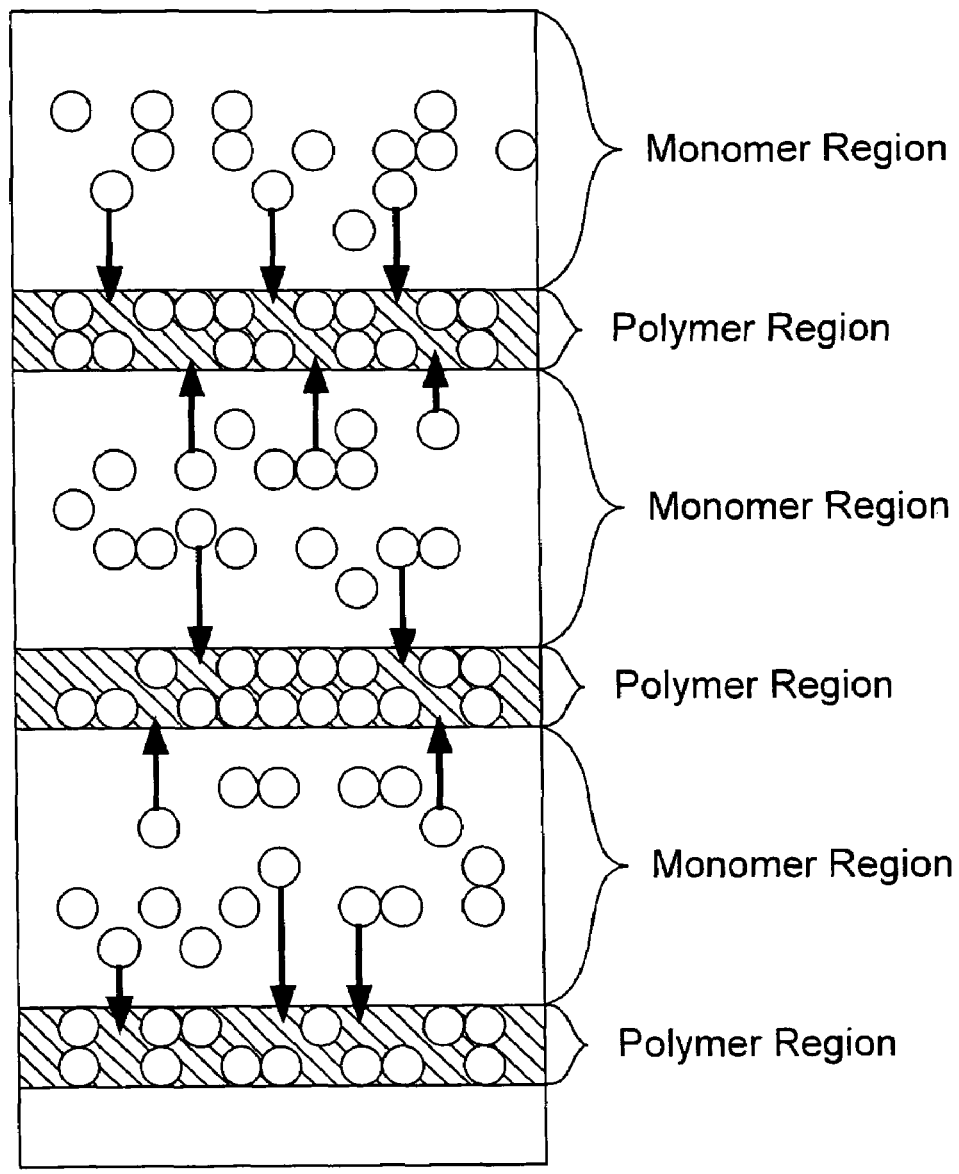
FIG. 2 schematically illustrates how monomers transform into polymers in a hologram medium in response to laser beam energy.
Figure 3:
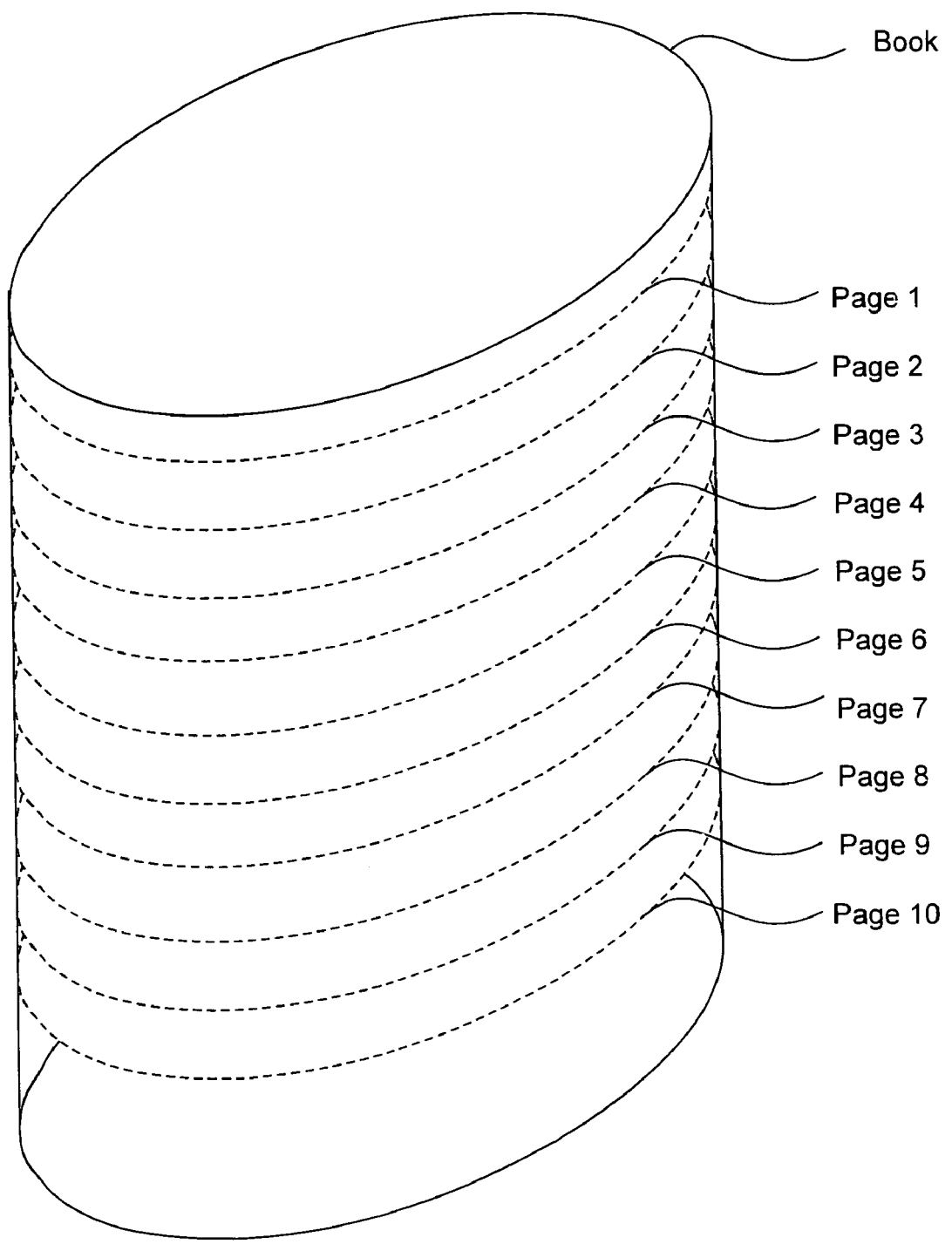
FIG. 3 schematically illustrates a book and pages in angle-multiplexed recording;.
Figure 4:
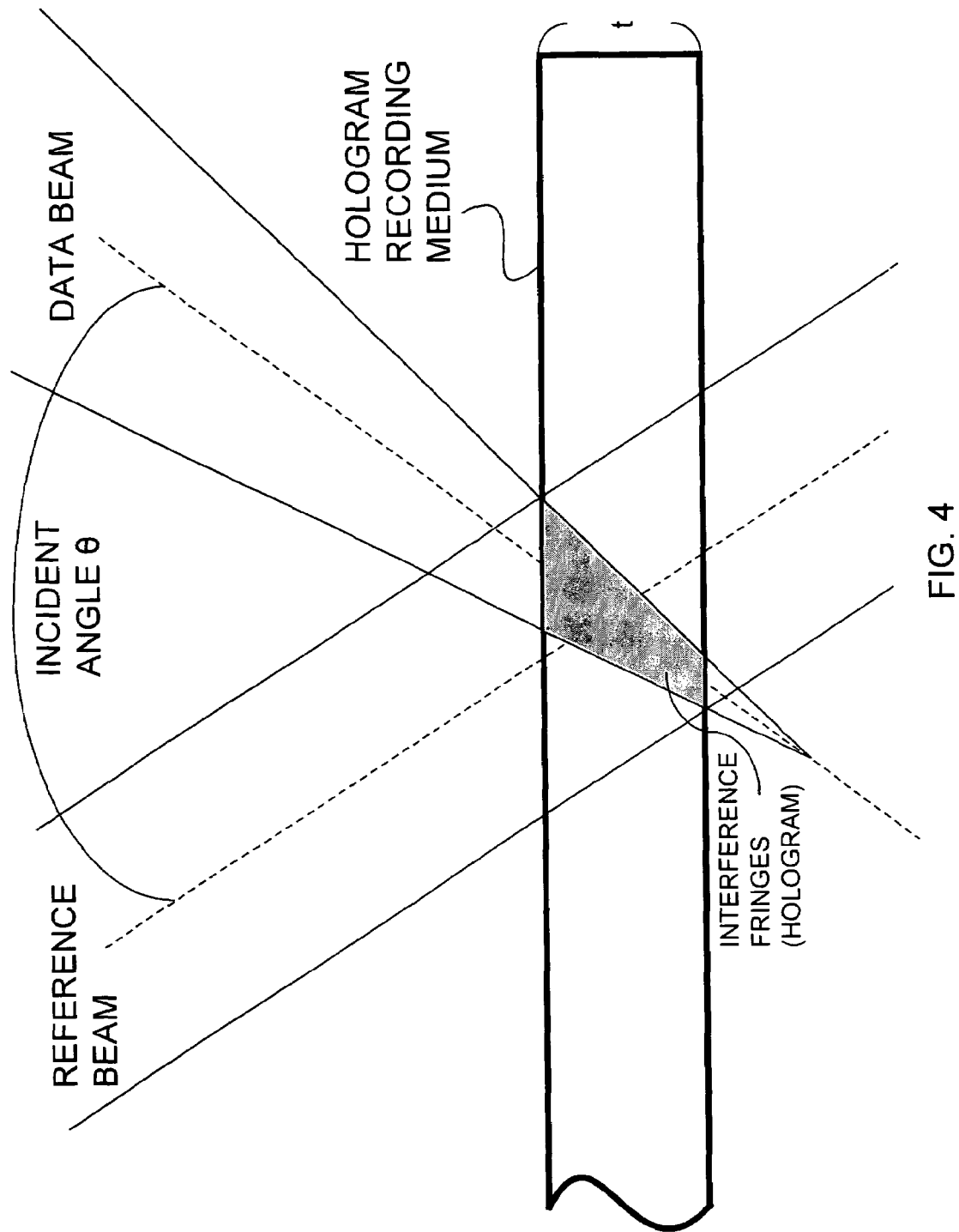
FIG. 4 is a diagram illustrating an incident angle θ between a data beam and a reference beam in hologram recording.
Figure 5:
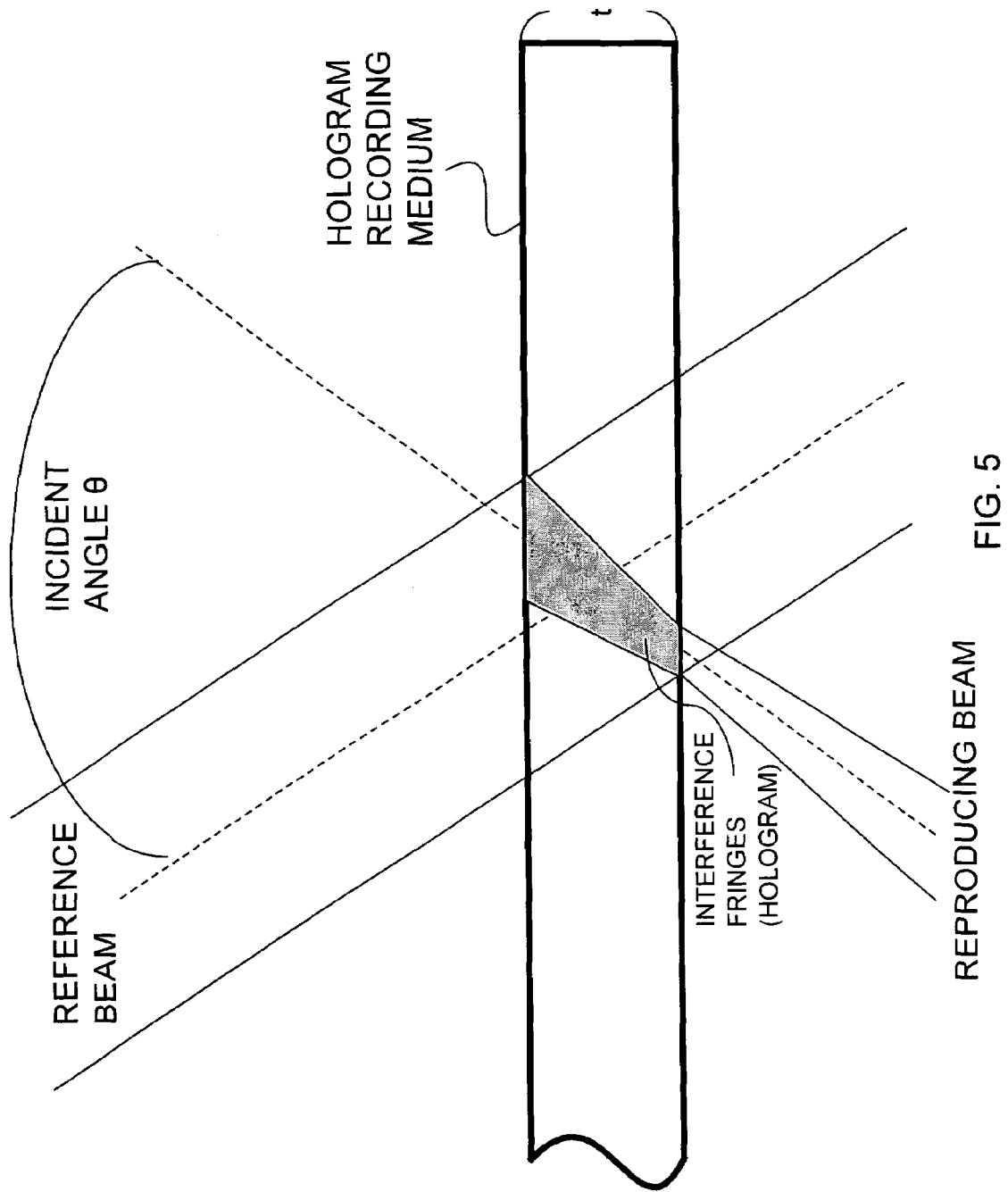
FIG. 5 is a diagram illustrating a reproducing angle θ of a reference beam in hologram reproducing.
Figure 6:
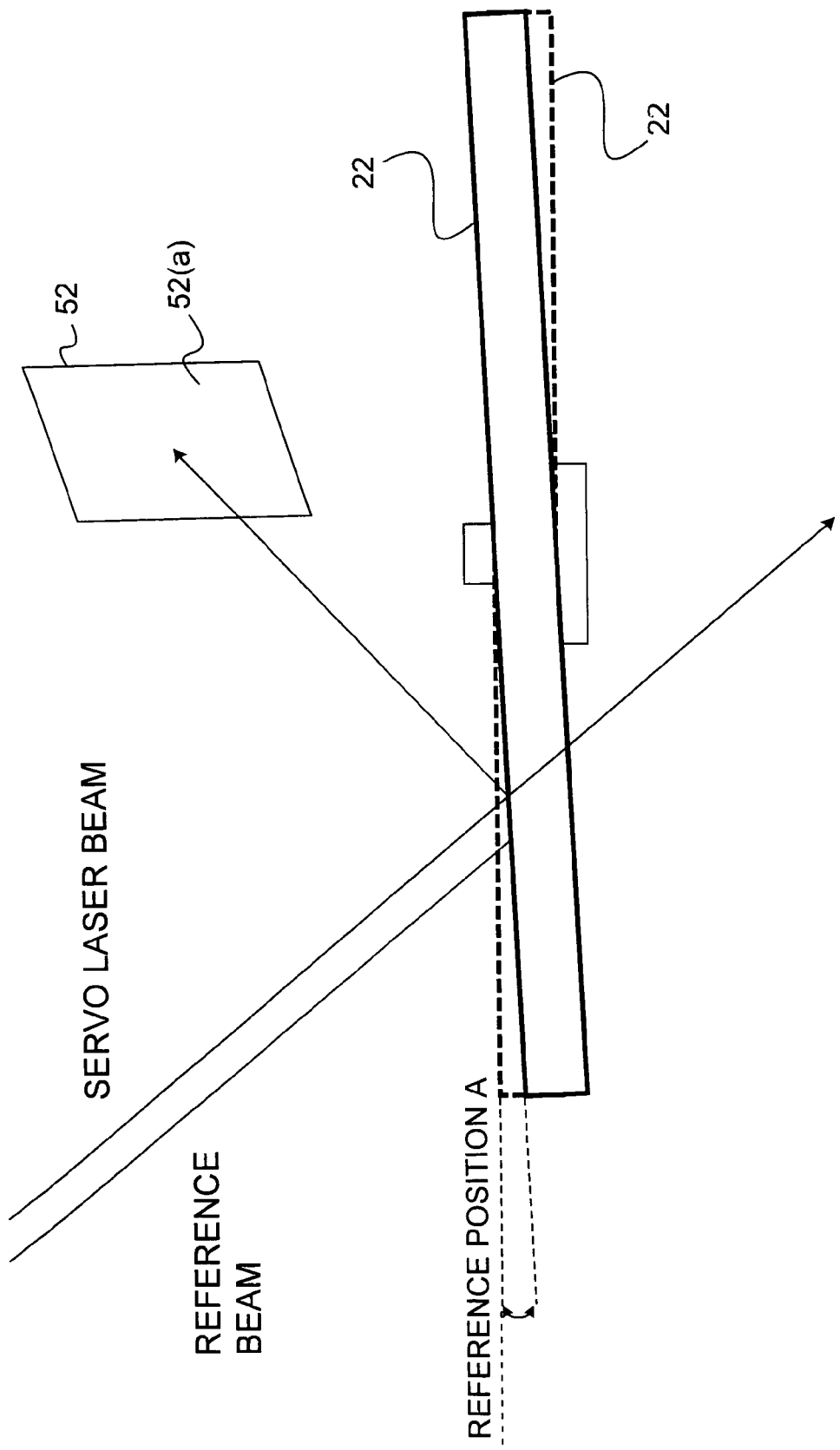
FIG. 6 is a diagram illustrating a servo laser beam being reflected by and passing through a disk medium.
Figure 9:
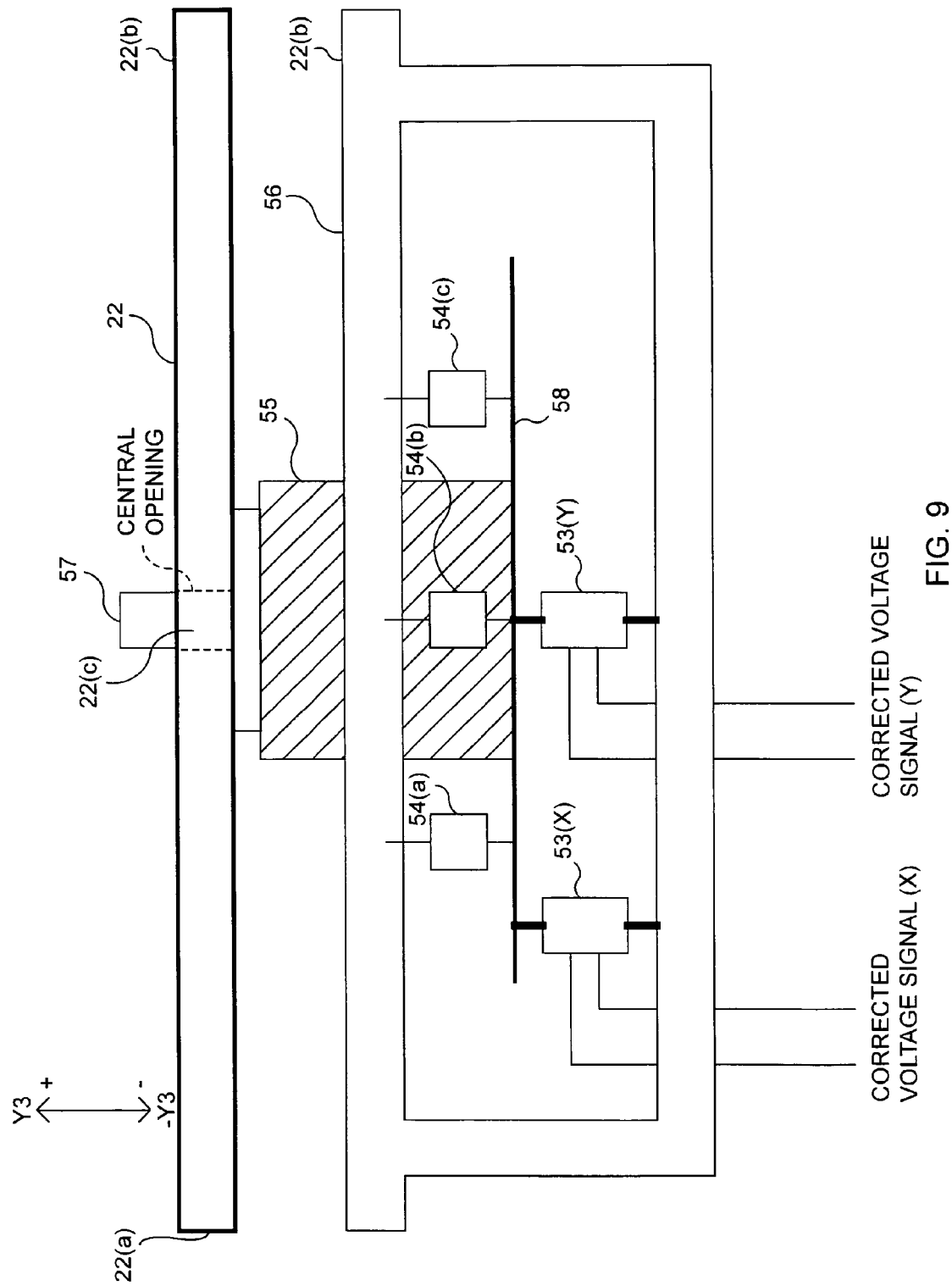
FIG. 9 is a detailed diagram of a disk driver.
Figure 10:
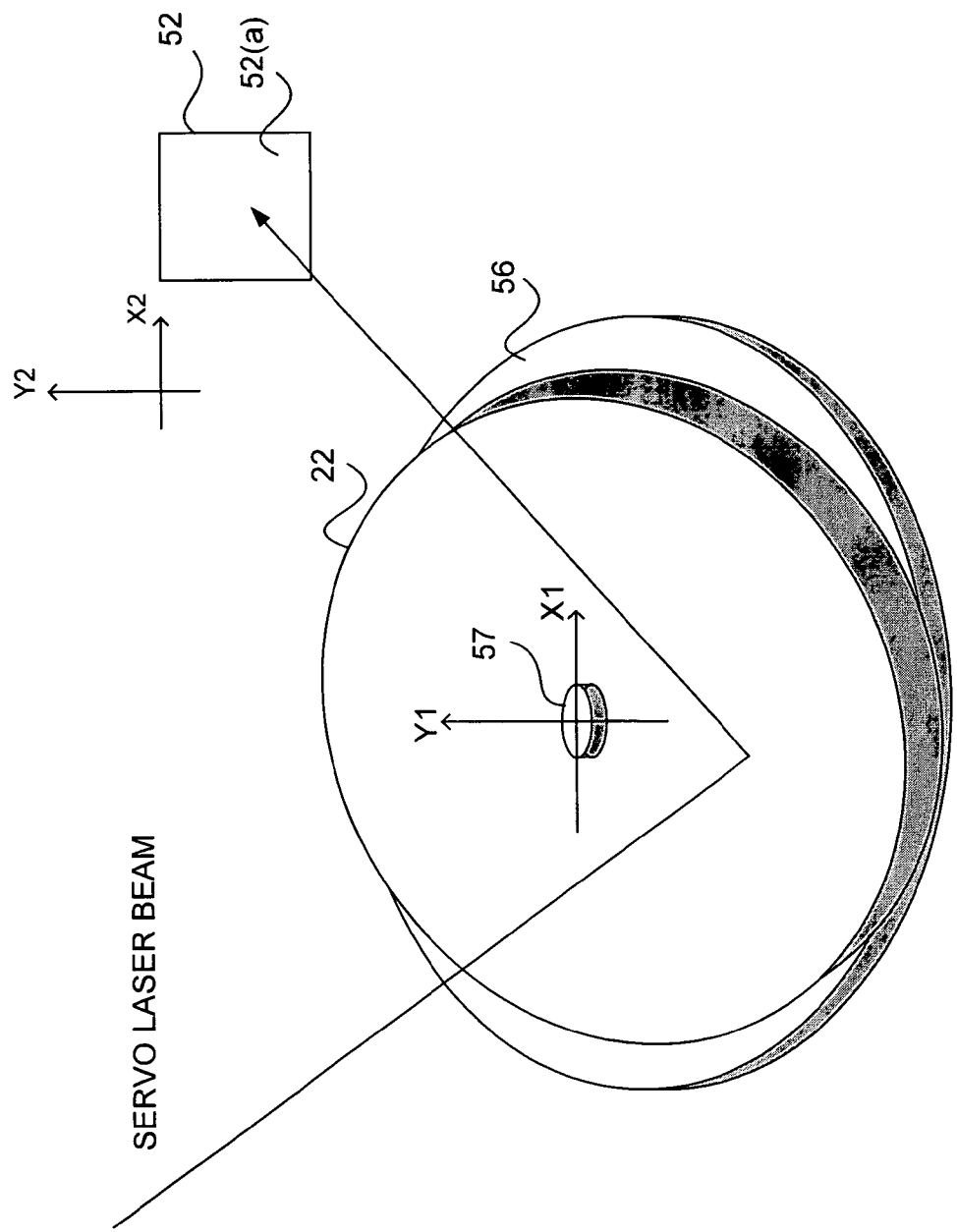
FIG. 10 is a diagram showing the disk medium of FIG. 6 as seen in a direction different from that of FIG. 6.

A tilt detection apparatus/hologram apparatus according to the present invention will be described with reference to FIGS. 1, 6, 9, 10. FIG. 1 is a functional block diagram illustrating an example of the overall configuration of the tilt detection apparatus/hologram apparatus according to the present invention. FIG. 6 is a diagram illustrating the reflection and transmission of a servo laser beam (tilt detection beam) when a disk medium 22 (a hologram medium) is tilted with respect to a reference position A. In FIG. 6, a disk medium 22 indicated by the broken line is a disk medium 22 in the reference position A, and a disk medium 22 indicated by the solid line is a disk medium 22 tilted with respect to the reference position A. FIG. 9 is a detailed diagram of a disk driver 25 (first and second correction drivers) of FIG. 1. FIG. 10 is a view showing a disk medium 22 of FIG. 6 as seen at a different angle than in FIG. 6. In the description below, an X1 direction (first direction) and a Y1 direction (second direction) in FIG. 10 are orthogonal to each other at the center of the disk medium 22.

The hologram apparatus has a CPU (Central Processing Unit) 1, a memory 2, an interface 3, a connection terminal 4, a buffer 5, a reproduction/recording determination unit 6, an encoder 7, a mapping process unit 8, an SLM (Spatial Light Modulator) 9, a laser device 10, a first shutter 11 (an interruption unit), a first shutter control unit 12, a PBS (Polarization Beam Splitter) 13, a second shutter 14, a second shutter control unit 15, a galvo mirror 16, a galvo mirror control unit 17, dichroic mirror 18, a servo laser device 19 (a tilt detection beam generator), a scanner lens 20, Fourier transform lenses 21 and 26, a detector 23, a disk control unit 24 (a servo control unit), a disk driver 25, an image sensor 27, an image sensor control unit 28, a filter 29, a decoder 30, a ½ wavelength plate 31, a PSD (Position Sensitive Detector) 52 (a light reception unit), difference units 32, 33 (calculation units), reference voltage generators 34, 35, low pass filters 36, 37 (first and second correction output units), amplifiers 38, 39 (the first and second correction output units), vibration amount detectors 40, 41 (vibration amount calculation units), reference vibration amount voltage generators 42, 43, comparators 44, 45 (vibration amount determination units), logical sum operators (hereinafter called OR circuits) 46, 47, a TFF (Toggle Flip Flop) 48, first, second, and third timers 49,50,51, and band pass filters 59, 60. The interface 3 allows for sending/receiving data between a host equipment (not shown) such as a PC (Personal Computer) connected thereto via the connection terminal 4 and the hologram apparatus.

The buffer 5 stores reproduction instruction data from the host equipment to reproduce the data recorded in the disk medium 22. Also, the buffer 5 stores recording instruction data used to record data from the host equipment in the disk medium 22. Further, the buffer 5 stores data to be recorded in the disk medium 22.

The reproduction/recording determination unit 6 determines at specified timings whether reproduction or recording instruction data is stored in the buffer 5. When determining that reproduction instruction data is stored in the buffer 5, the reproduction/recording determination unit 6 sends an instruction signal to carry out the reproduction process in the hologram apparatus to the CPU 1. When determining that recording instruction data is stored in the buffer 5, on the other hand, the reproduction/recording determination unit 6 sends an instruction signal to carry out the recording process in the hologram apparatus to the CPU 1 and makes the buffer 5 send to the encoder 7 the data from the host equipment to be recorded in the disk medium 22. Further, the reproduction/recording determination unit 6 sends information on the amount of the data to be recorded in the disk medium 22 to the CPU 1.

The encoder 7 carries out an encoding process on the data from the buffer 5.

The mapping process unit 8 rearranges the data from the encoder 7 into a two-dimensional data array (e.g., 1280 bits down×1280 bits across≈1.6 Mbits) to form page unit array data.

The SLM 9 forms a two-dimensional contrast image pattern based on the page unit array data formed by the mapping process unit 8. This two-dimensional contrast image pattern refers, for example, to a pattern formed by taking one of the logical values of the data bits of the page unit array data as 'light' and the other logical value as 'dark.' Supposing that the SLM 9 can create a two-dimensional contrast image pattern with 1280 pixels down by 1280 pixels across, the SLM 9 transforms the approximately 1.6 Mbits of data from the mapping process unit 8 into a two-dimensional contrast image pattern with every one bit being represented as a light or dark pixel. When the laser beam from the laser device 10 strikes the SLM 9 as described later, the SLM 9 reflects the beam toward the Fourier transform lens 21. This reflected beam is a laser beam (hereinafter referred to as data beam) reflecting information of the two-dimensional contrast image pattern formed by the SLM 9. It is to be noted that the present invention is not limited to the case where the laser beam from the PBS 13 directly strikes the SLM 9 as shown in FIG. 1. For example, a PBS (not shown) may be provided in the optical path between the second shutter 14 and the SLM 9 such that one of laser beams split by the PBS strikes the SLM 9.

The laser device 10 emits a laser beam, excellent in time and space coherence, to the first shutter 11. Used as the laser device 10 to form a hologram on the disk medium 22 are helium-neon, argon-neon, helium-cadmium, semiconductor, dye, and ruby lasers and the like.

The first shutter control unit 12 performs control to close the first shutter 11 on the basis of the instruction signal from the image sensor control unit 28. When closing the first shutter 11, the first shutter control unit 12 sends a close instruction signal to the first shutter 11.

The first shutter 11 opens when a high level is input from the TFF 48. The first shutter 11 remains open while the high level is input from the TFF 48. On the other hand, the first shutter 11 closes when a low level is input from the TFF 48. The first shutter 11 remains closed while the low level is input from the TFF 48. Further, the first shutter 11 closes on the basis of the close instruction signal from the first shutter control unit 12. When the first shutter 11 is closed, the laser beam from the laser device 10 is interrupted from striking the ½ wavelength plate 31.

The ½ wavelength plate 31 is provided to have a given inclination so as to set the angle for the laser beam from the laser device 10 to strike the PBS 13. It is to be noted that this given inclination of the ½ wavelength plate 49 is determined so as to achieve a desired split ratio of the two laser beams split by the PBS 13.

The PBS 13 splits the laser beam from the ½ wavelength plate 31 into two laser beams. One of the laser beams split by the PBS 13 strikes the second shutter 14. Meanwhile, the other laser beam (hereinafter referred to as reference beam) strikes the galvo mirror 16.

The galvo mirror 16 reflects the reference beam from the PBS 13 to the dichroic mirror 18.

The galvo mirror control unit 17 controls the angle of the galvo mirror 16 so as to adjust the angle for the reference beam, reflected by the galvo mirror 16, to strike the disk medium 22 via the dichroic mirror 18 and the scanner lens 20, according to an instruction signal from the CPU 1.

When recording a hologram, the galvo mirror control unit 17 adjusts the angle of the galvo mirror 16 to record information of a two-dimensional contrast image pattern on the disk medium 22. The galvo mirror control unit 17 changes the angle of the galvo mirror 16 to change the incidence angle of the reference beam onto the disk medium 22, thereby to enable the angle-multiplexed recording. A hologram formed on the disk medium 22 is hereinafter referred to as a page, and a multiplexed recorded hologram with a number of pages above one another created by the angle-multiplexed recording is referred to as a book.

During the reproduction of the holograms, the galvo mirror control unit 17 controls the angle of the galvo mirror 16 to adjust the incidence angle of the reference beam onto a hologram formed in the disk medium 22. This angle adjustment of the galvo mirror 16 by the galvo mirror control unit 17 is carried out corresponding to each of the holograms to be reproduced. That is, the angle adjustment of the galvo mirror 16 is performed such that the reference beam is made incident onto the hologram at an incidence angle within a very small angle difference of the incidence angle at which the hologram to be reproduced was formed.

The servo laser device 19 emits a laser beam (hereinafter called a servo laser beam) to the dichroic mirror 18 so as to irradiate the beam onto a pit on the disk medium 22 thereby detecting the position of the hologram formed on the medium 22 based on the address information represented by the pit. The servo laser beam emitted from the servo laser device 19 is a beam with a predetermined wavelength that does not affect the hologram formed on the disk medium 22. It is to be noted that in the present implementation the beam emitted from the laser device 10 is a blue laser beam and that a red laser beam, longer in wavelength than the blue laser beam, is used as the servo laser beam.

The emission of the servo laser beam from the servo laser device 19 begins, for example, when the tilt detection apparatus/hologram apparatus starts its operation, and the servo laser device 19 continues to emit the beam while the tilt detection apparatus/hologram apparatus is in operation. Although the servo laser device 19 continues the emission, the present invention is not limited thereto. For example, in data recording on the disk medium 22 by the hologram apparatus, the disk medium 22 is paused. For this reason, the irradiation of the servo laser beam by the servo laser device 19 may be halted during the period of time when the irradiation of the beam onto pits is not necessarily required. This can reduce the load associated with the emission of the servo laser beam on the servo laser device 19.

The dichroic mirror 18 transmits the reference beam reflected by the galvo mirror 16 to strike the scanner lens 20. Also, the dichroic mirror 18 reflects the servo laser beam emitted from the servo laser device 19 so that the laser beam strikes the scanner lens 20.

The scanner lens 20 refracts the reference beam from the dichroic mirror 18 so as to certainly irradiate the disk medium 22. The scanner lens 20 also causes the servo laser beam from the servo laser device 19, reflected by the dichroic mirror 18, to strike the disk medium 22.

The second shutter control unit 15 performs control to open or close the second shutter 14 according to an instruction signal from the CPU 1. When opening the second shutter 14, the second shutter control unit 15 sends an open instruction signal to the second shutter 14. When closing the second shutter 14, on the other hand, the second shutter control unit 15 sends a close instruction signal to the second shutter 14.

The second shutter 14 opens on the basis of the open instruction signal from the second shutter control unit 15. And the second shutter 14 closes on the basis of the close instruction signal from the second shutter control unit 15. When the second shutter 14 closes, one of the laser beams split by the PBS 13 is interrupted from striking the SLM 9. It is to be noted that the second shutter 14 may be provided in the optical path of the data beam from the SLM 9 incident upon the disk medium 22 via the Fourier transform lens 21.

The Fourier transform lens 21 first subjects the data beam to the Fourier transform process and then causes the beam to strike the disk medium 22 while collecting the data beam reflecting information of the two-dimensional contrast image pattern from the SLM 9.

A photosensitive resin (e.g., photopolymer, silver salt emulsion, gelatine bichromate, and photoresist), capable of storing data as a hologram, is used for the disk medium 22. This resin is sealed between glass substrates to form the disk medium 22. Furthermore, a central opening is made in the disk medium 22 (FIG. 9), and a support 57 of the disk driver 25 described later is inserted into it, and thereby the disk medium 22 is secured to the disk driver 25. A hologram is formed in the disk medium 22 by the interference between the Fourier-transformed data beam from the Fourier transform lens 21, representing the two-dimensional contrast image pattern, and the reference beam from the scanner lens 20. Then, following the angle adjustment of the galvo mirror 16 by the galvo mirror control unit 17 as described above, another hologram is formed by the interference between the reference beam from the galvo mirror 16 and the data beam. This allows the angle-multiplexed recording to be carried out, thus forming a book.

Meanwhile, for example, wobbles are formed in advance on the glass substrates forming part of the disk medium 22 and address information is recorded in advance in the wobbles as pits to identify the positions of the holograms to be formed on the disk medium 22. Then, the servo laser beam, incident through the scanner lens 20 from the servo laser device 19, is irradiated onto pits representing address information. The servo laser beam having irradiated the pits representing the address information is incident on the detector 23. Part of the servo laser beam incident on the disk medium 22 is reflected by the disk medium 22, and then made incident on the PSD 52. While in the present implementation the disk medium 22 is used to record or reproduce a hologram, the present invention is not limited thereto. For example, a polygonal medium may be used which is placed in a driver having the same function as the disk driver 25 and reflects the servo laser beam. The disk medium 22 is used in the present implementation because the disk medium 22 is easy to detect the tilt and vibration thereof and is flexible and convenient to carry.

Part of the servo laser beam reflected by the disk medium 22 is made incident on a light reception surface 52(a) (FIGS. 6, 10) of the PSD 52. The light reception surface of the PSD 52 extends in an X2 direction parallel to the X1 direction and in a Y2 direction parallel to the Y1 direction. PSD 52 outputs an analog electric signal (X) corresponding to the position in the X2 direction at which the servo laser beam is received to the difference unit 32 and the band pass filter 59. The PSD 52 also outputs an analog electric signal (Y) corresponding to the position in the Y2 direction at which the servo laser beam is received to the difference unit 33 and the band pass filter 60.

The reference voltage generator 34 outputs an analog electric signal (hereinafter called a reference analog electric signal (X)) corresponding to the beam-receiving position in the X2 direction for when the disk medium 22 is in the reference position A to the difference unit 32. A detailed description of the reference analog electric signal (X) is as follows. For example, in experiment or the like, the disk medium 22 is precisely placed in the reference position A and the servo laser beam is made incident thereon. Part of the servo laser beam reflected by the disk medium 22 is incident on the PSD 52. At this time, the analog electric signal (X) output from the PSD 52 is the reference analog electric signal (X). The reference voltage generator 34 is for outputting the reference analog electric signal (X) to the difference unit 32.

The difference unit 32 outputs a voltage signal (hereinafter called a difference voltage signal (X)) indicating the difference between the analog electric signal (X) from the PSD 52 and the reference analog electric signal (X) to the low pass filter 36.

The low pass filter 36 passes to the amplifier 38 only components having a frequency lower than a predetermined frequency of the difference voltage signal (X) from the difference unit 32. This predetermined frequency can be obtained from a later-described maximum frequency at which the disk driver 25 to correct the tilt of the disk medium 22 is operable. The band pass filter 59 passes only components having a frequency, within a frequency band having the predetermined frequency as its minimum, of the analog electric signal (X) to the vibration amount detector 40. The variations in frequency of the components of the analog electric signal (X) correspond to the variations in tilt and vibration occurring in the disk medium 22. As long as it is possible for the disk driver 25 to correct the variations in tilt and vibration occurring in the disk medium 22, the low pass filter 36 outputs to the amplifier 38 only voltage signal components having a frequency lower than the predetermined frequency. In the present implementation, the predetermined frequency is set equal to the maximum frequency at which the disk driver 25 is operable, but the present invention is not limited thereto. For example, the predetermined frequency may be set lower than the maximum frequency at which the disk driver 25 is operable so that the disk driver 25 operates more certainly. The low pass filter 36 cuts components having the predetermined or higher frequency off the difference voltage signal (X), and thereby electric noise due to the hologram apparatus and the like is cut off. Thus, the disk driver 25 is prevented from malfunctioning due to the electric noise.

The amplifier 38 amplifies the voltage signal from the low pass filter 36 with a predetermined gain, and the amplified voltage signal (hereinafter called a corrected voltage signal (X)) is applied to a solenoid 53(X) of the disk driver 25.

The reference voltage generator 35 outputs an analog electric signal (hereinafter called a reference analog electric signal (Y)) corresponding to the beam-receiving position in the Y2 direction for when the disk medium 22 is in the reference position A to the difference unit 33. The reference voltage generator 35 is provided for a like reason as the reference voltage generator 34.

The difference unit 33 outputs a voltage signal (hereinafter called a difference voltage signal (Y)) indicating the difference between the analog electric signal (Y) from the PSD 32 and the reference analog electric signal (Y) to the low pass filter 37.

The low pass filter 37 passes to the amplifier 39 only components having a frequency lower than a predetermined frequency of the difference voltage signal (Y) from the difference unit 32. The band pass filter 60 passes only components having a frequency, within a frequency band having the predetermined frequency as its minimum, of the analog electric signal (Y) to the vibration amount detector 41. The predetermined frequency can be obtained as for the low pass filter 36. The low pass filter 37 cuts components having the predetermined or higher frequency off the difference voltage signal (Y), and thereby electric noise due to the hologram apparatus and the like is cut off. Thus, the disk driver 25 can be prevented from malfunctioning due to the electric noise.

The voltage signal from the low pass filter 37 is amplified by the amplifier 39 with a predetermined gain (hereinafter, the voltage signal amplified by the amplifier 39 being called a corrected voltage (Y)) and then applied to a solenoid 53(Y) of the disk driver 25.

The servo laser beam from the servo laser device 19 that has irradiated pits representing address information formed in the disk medium 22 is made incident on the detector 23. The detector 23 comprises, for example, a four section photodetector (not shown) and sends the CPU 1 the address information from the servo laser beam detected by the four section photo-detector.

The disk control unit 24, according to an instruction signal from the CPU 1, sends to the disk driver 25 an instruction signal to rotate the disk medium 22 so as to irradiate the servo laser beam onto pits representing desired address information formed in the disk medium 22. When the book has been formed in the disk medium 22, the disk control unit 24 sends to the disk driver 25 an instruction signal to rotate the disk medium 22 so as to form a hologram at another location in the disk medium 22.

The disk driver 25, as shown in FIG. 9, comprises a frame 56, springs 54(*a*), 54(*b*), 54(*c*), a solenoid 53(X), a solenoid 53(Y), a support 57, a rotator 55, and a rotator support plate 58. The support 57 is inserted into the central opening of the disk medium 22, thereby securing the disk medium 22 to the disk driver 25. The rotator 55 is provided on the rotator support plate 58 and rotates the disk medium 22 according to an instruction signal from the disk control unit 24. Note that in FIGS. 1, 9, for convenience of description, the circuitry (such as a digital-to-analog converter and an amplifier) for rotating the disk medium 22 according to the instruction signal from the disk control unit 24 is omitted. The springs 54(*a*), 54(*b*), 54(*c*) are provided between the frame 56 and the rotator support plate 58 as a basic measure to deal with the tilt and vibration of the disk medium 22. The solenoid 53(X) has the corrected voltage (X) from the amplifier 38 applied thereto, and pushes up in a +Y3 direction or pulls down in a −Y3 direction the rotator support plate 58 according to the level of the corrected voltage (X). By the solenoid 53(X) pushing up the rotator support plate 58 in the +Y3 direction, an end face 22(*a*) of the disk medium 22 is pushed up while an end face 22(*b*) is pulled down. Conversely, by the solenoid 53(X) pulling down the rotator support plate 58 in the −Y3 direction, the end face 22(*a*) of the disk medium 22 is pulled down while the end face 22(*b*) is pushed up. The solenoid 53(Y) has the corrected voltage (Y) from the amplifier 39 applied thereto, and pushes up in the +Y3 direction or pulls down the rotator support plate 58 according to the level of the corrected voltage (Y). By the solenoid 53(Y) pushing up the rotator support plate 58 in the +Y3 direction, an end face (c) (in the front of FIG. 9 and in the middle between the end faces 22(*a*), 22(*b*)) of the disk medium 22 is pushed up while an end face (d) (not shown) opposite to the end face (c) with respect to the support 57 as a center is pulled down. Conversely, by the solenoid 53(Y) pulling down the rotator support plate 58 in the −Y3 direction, the end face 22(*c*) of the disk medium 22 is pulled down while the end face 22(*d*) is pushed up. Note that the solenoid 53(X) is oriented in the X1 direction of FIG. 10 and the solenoid 53(Y) is oriented in the Y1 direction.

The vibration amount detector 40 detects the amplitude of the analog electric signal (X) from the analog electric signal (X) output from the band pass filter 59, and outputs a voltage corresponding to the amplitude (hereinafter called an amplitude voltage (X)) to the comparator 44. For example, when the disk medium 22 is tilted in the X1 direction with respect to the reference position A continuously (that is, when the disk medium 22 is vibrating), the amplitude voltage (X) output from the vibration amount detector 40 indicates the magnitude of the vibration of the disk medium 22.

The reference vibration amount voltage generator 42 outputs a reference voltage Vref(X) to the comparator 44. The reference voltage Vref(X) is the amplitude voltage (X) having a level defined as follows. For example, in experiment for when recording holograms, if such vibration is caused to occur that the amplitude voltage (X) output from the vibration amount detector 40 becomes lower than that level, a hologram having the specified value of diffraction efficiency is formed in the disk medium 22, and if such vibration is caused to occur that the amplitude voltage (X) output from the vibration amount detector 40 becomes no lower than that level, a hologram having the specified value of diffraction efficiency is not formed in the disk medium 22. Thus, the reference vibration amount voltage generator 42 outputs the reference voltage Vref(X) to the comparator 44 to indicate that vibration lower in amplitude than the reference voltage Vref(X) is tolerable.

When the amplitude voltage (X) from the vibration amount detector 40 is higher than the reference voltage Vref(X) from the reference vibration amount voltage generator 42, the comparator 44 outputs one logic value '1' to the OR circuit 46 and the CPU 1. In this implementation, when the amplitude voltage (X) is higher than the reference voltage Vref(X), the comparator 44 outputs one logic value '1', but this invention is not limited to this. For example, another reference voltage Vref(X) lower than the reference voltage Vref(X) may be provided, and the comparator 44 may compare the amplitude voltage (X) with the lower reference voltage Vref(X). In this case, a hologram having the specified value of diffraction efficiency can be formed in the disk medium 22 more certainly, and a hologram not having the specified value of diffraction efficiency can be prevented from being formed.

The vibration amount detector 41 detects the amplitude of the analog electric signal (Y) from the analog electric signal (Y) output from the band pass filter 60, and outputs a voltage corresponding to the amplitude (hereinafter called an amplitude voltage (Y)) to the comparator 44. For example, when the disk medium 22 is tilted in the Y1 direction with respect to the reference position A continuously (that is, when the disk medium 22 is vibrating), the amplitude voltage (Y) output from the vibration amount detector 41 indicates the magnitude of the vibration of the disk medium 22.

The reference vibration amount voltage generator 43 outputs a reference voltage Vref(Y) to the comparator 45. Note that the reference vibration amount voltage generator 43 is provided for a like reason as the reference vibration amount voltage generator 42.

When the amplitude voltage (Y) from the vibration amount detector 41 is higher than the reference voltage Vref(Y) from the reference vibration amount voltage generator 43, the comparator 45 outputs the one logic value '1' to the OR circuit 46 and the CPU 1. In this implementation, when the amplitude voltage (Y) is higher than the reference voltage Vref(Y), the comparator 45 outputs the one logic value '1', but this invention is not limited to this. For example, another reference voltage Vref(Y) lower than the reference voltage Vref(Y) may be provided, and the comparator 45 may compare the amplitude voltage (Y) with the lower reference voltage Vref (Y). In this case, a hologram having the specified value of diffraction efficiency can be formed in the disk medium 22 more certainly, and a hologram not having the specified value of diffraction efficiency can be prevented from being formed.

The OR circuit 46 outputs the one logic value '1' to the OR circuit 47 when at least either of the outputs of the comparators 44, 45 is at the one logic value '1'. The OR circuit 47 outputs the one logic value '1' to the TFF 48 when at least either of the outputs of the OR circuit 46 and the CPU 1 is at the one logic value '1'.

The TFF 48 has a T terminal (trigger input), an R terminal (reset terminal), and a Q terminal (output terminal). A trigger signal from the CPU 1 is input to the T terminal of the TFF 48. When the trigger signal is inputted, the TFF 48 outputs, e.g., a high level through the Q terminal to open the first shutter 11. The output of the OR circuit 47 is input to the R terminal of the TFF 48. When the one logic value '1' is inputted, the TFF 48 outputs, e.g., a low level through the Q terminal to close the first shutter 11. The TFF 48 continues to outputs the high level through the Q terminal until the one logic value '1' is inputted to the R terminal.

The CPU 1 controls the hologram apparatus overall. Upon receiving an instruction signal based on the recording instruction data from the reproduction/recording determination unit 6, the CPU 1 reads out address information represented by pits formed on the disk medium 22 from the memory 2. Then, the CPU 1 sends the disk control unit 24 an instruction signal to rotate the disk medium 22 SO as to irradiate the servo laser beam from the servo laser device 19 onto pits representing next address information and also sends the galvo mirror control unit 17 an instruction signal to adjust the angle of the galvo mirror 16.

Further, the CPU 1 calculates the number of holograms to be formed (that is, the number of pages) in the disk medium 22 based on data amount information from the reproduction/recording determination unit 6, and calculates a recording laser beam irradiation time T for each of the number of pages. This recording laser beam irradiation time T is an irradiation time of the data beam and the reference beam for when a hologram having the specified value of diffraction efficiency is formed, e.g., in experiment. After calculating the recording laser beam irradiation time T, the CPU 1 sends the TFF 48 a trigger signal to open the first shutter 11 and the second shutter control unit 15 an instruction signal to open the second shutter 14. Also, in order to determine whether the recording laser beam irradiation time T has elapsed, the CPU 1 starts the time count of the first timer 49, and a hologram starts to be recorded in the disk medium 22.

When the one logic value '1' is input from the comparator 44, the CPU 1 stops the time count of the first timer 49. When the one logic value '1' comes not to be input from the comparator 44, the CPU 1 starts the time count of the second timer 50, and determines whether the time count of the second timer 50 has reached a predetermined time period t(X). This predetermined time period t(X) is a time period during which the amplitude voltage (X) from the vibration amount detector 40 is lower than the reference voltage Vref(X) from the reference vibration amount voltage generator 42. That is, the time count of the second timer 50 having reached the predetermined time period t(X) means that the vibration of the disk medium 22 in the X1 direction has subsided and the data beam and the reference beam can be irradiated onto the disk medium 22 again. When determining that the time count of the second timer 50 has reached the predetermined time period t(X), the CPU 1 sends a trigger signal to the TFF 48 to restart the time count of the first timer 49.

When the one logic value '1' is inputted from the comparator 45, the CPU 1 stops the time count of the first timer 49. When the one logic value '1' comes not to be input from the comparator 45, the CPU 1 starts the time count of the third timer 51, and determines whether the time count of the third timer 51 has reached a predetermined time period t(Y). This predetermined time period t(Y) is a time period during which the amplitude voltage (Y) from the vibration amount detector 41 is lower than the reference voltage Vref(Y) from the reference vibration amount voltage generator 43. That is, the time count of the third timer 51 having reached the predetermined time period t(Y) means that the vibration of the disk medium 22 in the Y1 direction has subsided and the data beam and the reference beam can be irradiated onto the disk medium 22 again. When determining that the time count of the third timer 51 has reached the predetermined time period t(Y), the CPU 1 sends a trigger signal to the TFF 48 to restart the time count of the first timer 49.

Then, when determining that the time count of the first timer 49 has reached the recording laser beam irradiation time T, the CPU 1 sends the OR circuit 47 the one logic value '1', and the second shutter control unit 15 an instruction signal to close the second shutter 14. Thereby, the recording of the hologram in the disk medium 22 ends.

In contrast, upon receiving an instruction signal based on the reproducing instruction data from the reproduction/recording determination unit 6, the CPU 1 sends the disk control unit 24 an instruction signal to rotate the disk medium 22 so as to irradiate the servo laser beam onto pits representing address information of the hologram (hereinafter called a to-be-reproduced hologram) designated in the instruction signal, and also sends the galvo mirror control unit 17 an instruction signal to adjust the angle of the galvo mirror 16 so as to make the reference beam incident onto the to-be-reproduced hologram. And the CPU 1 calculates a reproducing laser beam irradiation time T for the to-be-reproduced hologram. This reproducing laser beam irradiation time T is time for irradiation of the reference beam on the to-be-reproduced hologram that it takes for the image sensor 27 to receive a reproducing beam of a specified light intensity described later, e.g., in experiment. After calculating the reproducing laser beam irradiation time T, the CPU 1 sends the TFF 48 a trigger signal to open the first shutter 11 and the second shutter control unit 15 an instruction signal to close the second shutter 14. Also, in order to determine whether the reproducing laser beam irradiation time T has elapsed, the CPU 1 starts the time count of the first timer 49, and the hologram starts to be reproduced from the disk medium 22.

When determining that the time count of the first timer 49 has reached the reproducing laser beam irradiation time T, the CPU 1 sends the one logic value '1' to the OR circuit 47. Thereby the reproducing of the hologram from the disk medium 22 ends.

The first timer 49 starts to count the reproducing laser beam irradiation time T according to an instruction signal from the CPU 1 and stops counting according to an instruction signal from the CPU 1.

The second timer 50 starts to count the predetermined time period t(X) according to an instruction signal from the CPU 1.

The third timer 51 starts to count the predetermined time period t(Y) according to an instruction signal from the CPU 1.

The Fourier transform lens 26 receives the reference beam incident on the disk medium 22 and then diffracted by a hologram recorded in the hologram medium 22 (hereinafter called a reproducing beam) during the hologram reproduction. This reproducing beam reflects the two-dimensional contrast image pattern of the hologram irradiated by the reference beam. The Fourier transform lens 26 makes the reproducing beam inverse-Fourier-transformed be incident on the image sensor 27.

The image sensor 27 is capable of reproducing a two-dimensional contrast image pattern of 1280 pixels by 1280 pixels like the SLM 9 does. The image sensor 27 is constituted by, for example, a CCD (Charge Coupled Device) or CMOS (Complementary Metal Oxide Semiconductor) image sensor, and is irradiated by the inverse-Fourier-transformed reproducing beam from the Fourier transform lens 26. The image sensor 27 converts lightness/darkness in the reproduced two-dimensional contrast image pattern to being strong/weak in electric signal intensity and sends to the filter 29 an analog electric signal having levels corresponding to the light intensities of lightness and darkness in the two-dimensional contrast image pattern. In the present implementation, both the image sensor 27 and the SLM 9 are capable of reproducing a two-dimensional contrast image pattern of 1280 pixels by 1280 pixels, but the invention is not limited to this. For example, the image sensor 27 may be configured to have more pixels for reproducing than the SLM 9. In this case, the reproducing beam from the Fourier transform lens 26 irradiates the image sensor 27 certainly, and thus, two-dimensional contrast image patterns can be reproduced certainly. Demand on accuracy with which the image sensor control unit 28 controls the image sensor 27 to move to a desired position can be reduced.

The image sensor control unit 28 controls the image sensor 27 to move to a desired position so as to make sure that the image sensor 27 receives the reproducing beam. Furthermore, if the image sensor control unit 28 determines that the image sensor 27 has been irradiated by the reproduction beam by the given or greater light amount, the image sensor control unit 28 sends an instruction signal to the first shutter control unit 12 to close the first shutter 11.

The filter 29 filters the analog electric signal that is based on the lightness/darkness in the two-dimensional contrast image pattern reproduced by the image sensor 27 to enhance the separability in the binarization process. For example, the two-dimensional contrast image pattern reproduced by the image sensor 27 may not be as clear in lightness/darkness as the two-dimensional contrast image pattern formed by the SLM 9 due, for example, to noise to which the data and reproduction beams are subjected. This may make it unclear whether the analog electric signal based on the lightness/darkness in the two-dimensional contrast image pattern reproduced by the image sensor 27 is at a level representing 'lightness' or 'darkness', thus leading to an inappropriate binarization process. For this reason, the filtering is conducted by the filter 29 to correct the level of the analog electric signal. It is to be noted that a binarization process unit (not shown) is provided in between the filter 29 and the decoder 30 to perform the binarization process on the analog electric signal from the filter 29 in the present implementation. A description will be provided below on the assumption that the digital signal obtained as a result of the binarization process is sent to the decoder 30.

The decoder 30 carries out the decoding process on the digital signal from the binarization process unit.

The memory 2 stores in advance program data used by the CPU 1 to perform the above-described processes. The memory 2 also stores the address information from the pits formed on the disk medium 22. The memory 2 is a nonvolatile storage element where data can be repeatedly written and read by electrically deleting data.

===Operation (Recording) of Tilt Detection Apparatus/Hologram Apparatus===

Figure 7:
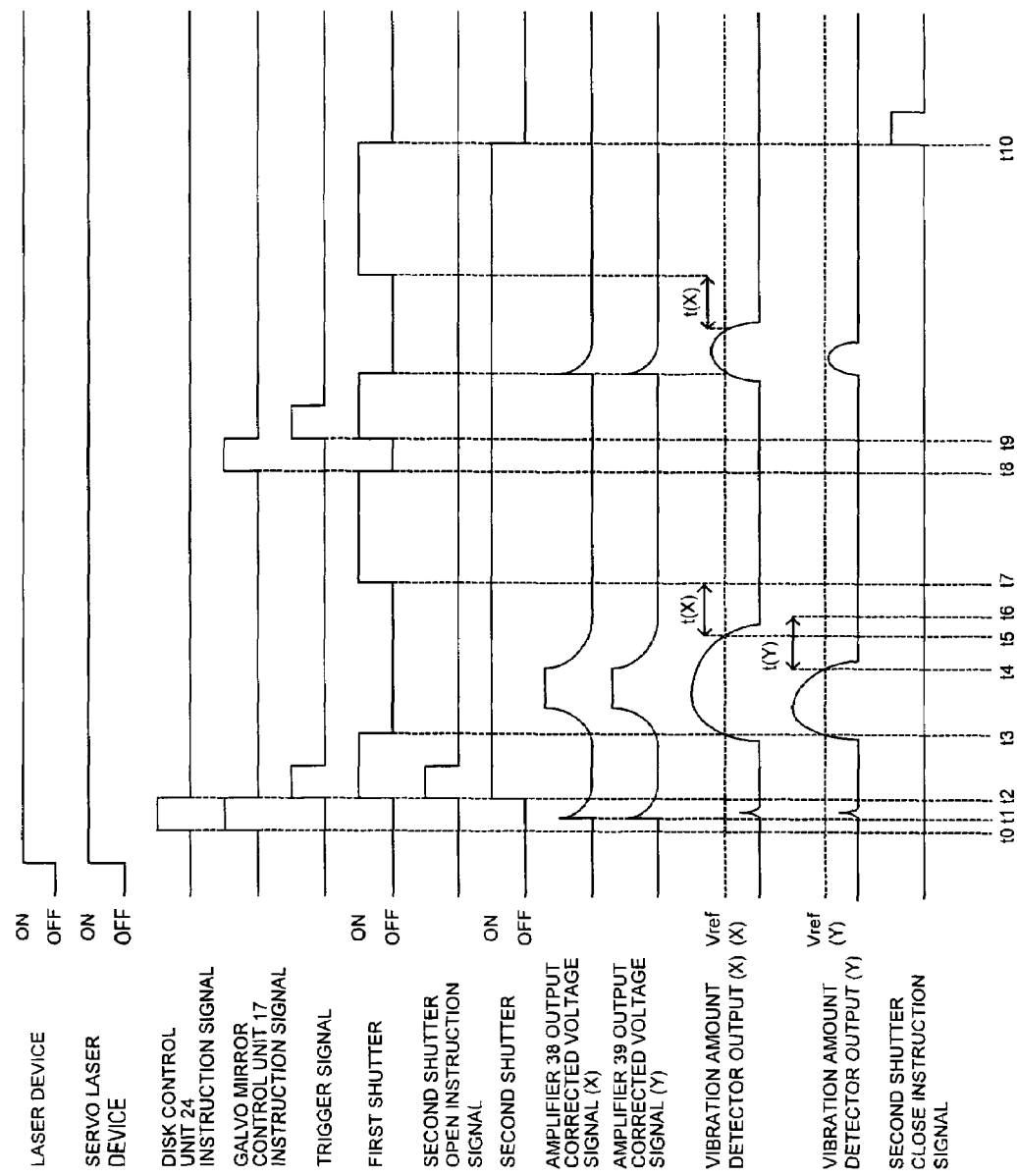
FIG. 7 is a timing chart illustrating an example of the operation in hologram recording of the tilt detection apparatus/hologram apparatus according to the present invention.

A description will be provided below of the operation in recording of the tilt detection apparatus/hologram apparatus according to the invention with reference to FIGS. 1, 6, 7, 9 and 10. FIG. 7 is a timing chart illustrating an example of the operation of the tilt detection apparatus/hologram apparatus according to the present invention. For the present implementation, the following description will be made assuming that no hologram has been formed (that is, no data has been recorded) on the disk medium 22.

For example, when recording instruction data is stored in the buffer 5 from the host equipment such as a PC via the connection terminal 4 and the interface 3, the reproduction/recording determination unit 6 determines that the recording instruction data is stored in the buffer 5. Then, the reproduction/recording determination unit 6 sends an instruction signal to the CPU 1 to carry out the recording process in the hologram apparatus. It is assumed that data to be recorded in the disk medium 22 has been sent and stored in the buffer 5 from the host equipment. The reproduction/recording determination unit 6 sends information on the amount of data to be recorded in the disk medium 22 to the CPU 1. Then, the reproduction/recording determination unit 6 sends the data stored in the buffer 5 to be recorded in the disk medium 22 to the encoder 7.

Upon receiving an instruction signal based on the recording instruction data from the reproduction/recording determination unit 6, the CPU 1 reads address information of the holograms, if any, already formed on the disk medium 22 from among the address information stored in the memory 2. It is to be noted that a hologram has not yet been formed on the disk medium 22 in the present implementation as described above, and therefore, the CPU 1 determines that no information about holograms formed in the disk medium 22 is available. Also, the CPU 1 calculates the number of pages to be formed in the disk medium 22 based on information about the data amount from the reproduction/recording determination unit 6. In this implementation, the information about the data amount indicates 3 Mbits and the CPU 1 calculates the number of pages to be two. Then, the CPU 1 sends instruction signals to the galvo mirror control unit 17 and the disk control unit 24 (disk control unit 24 instruction signal (at t0) and galvo mirror control unit 17 instruction signal (at t0) in FIG. 7) to start the formation of holograms, for example, from at the position of the disk medium 22 where first address information is formed in the form of pits.

The servo laser device 19 starts to emit the servo laser beam (as denoted by servo laser device in FIG. 7) when the tilt detection apparatus/hologram apparatus starts its operation. This servo laser beam is reflected by the dichroic mirror 18 to strike the scanner lens 20. The servo laser beam incident on the scanner lens 20 is then irradiated onto the pits representing the address information formed on the disk medium 22 and strikes the detector 23. Part of the servo laser beam is reflected by the disk medium 22 and strikes the PSD 52.

The detector 23 sends the CPU 1 the address information based on the servo laser beam incident on the four-section photodetector (not shown).

The CPU 1 determines based on the address information from the detector 23 whether the address information represents the first address information. If determining that the address information does not represent the first address information, the CPU 1 sends an instruction signal to the disk control unit 24 to rotate the disk medium 22 and irradiate the servo laser beam onto pits representing the first address information.

The disk control unit 24 sends an instruction signal to the disk driver 25 according to the instruction signal from the CPU 1 to rotate the disk medium 22.

The disk driver 25 rotates the disk medium 22 according to the instruction signal from the disk control unit 24 so as to make the servo laser beam onto the pits representing the first address information.

A description will be made of the case where the support 57 of the disk driver 25 is not precisely inserted in the central opening of the disk medium 22 and the disk medium 22 is tilted in the X1 and Y1 directions.

Part of the servo laser beam reflected by the tilted disk medium-22 is made incident on the light reception surface 52($a$) of the PSD 52. The PSD 52 outputs an analog electric signal (X) corresponding to the position in the X2 direction at which the servo laser beam is received to the difference unit 32 and the band pass filter 59. The PSD 52 also outputs an analog electric signal (Y) corresponding to the position in the Y2 direction at which the servo laser beam is received to the difference unit 33 and the band pass filter 60.

The difference unit 32 outputs to the low pass filter 36 the difference voltage signal (X) indicating the difference between the analog electric signal (X) from the PSD 52 and the reference analog electric signal (X) from the reference voltage generator 34. Because the disk medium 22 is tilted in the X1 direction, the difference voltage signal (X) is at a level corresponding to the distance between the position at which the servo laser beam is received when the medium 22 is in the reference position A and that position for the medium 22 being tilted.

The difference unit 33 outputs to the low pass filter 36 the difference voltage signal (Y) indicating the difference between the analog electric signal (Y) from the PSD 52 and the reference analog electric signal (Y) from the reference voltage generator 34. Because the disk medium 22 is tilted in the Y1 direction, the difference voltage signal (Y) is at a level corresponding to the distance between the position at which the servo laser beam is received when the medium 22 is in the reference position A and that position for the medium 22 being tilted.

The low pass filter 36 passes to the amplifier 38 only components having a frequency lower than a predetermined frequency of the difference voltage signal (X) from the difference unit 32.

The low pass filter 37 passes to the amplifier 39 only components having a frequency lower than the predetermined frequency of the difference voltage signal (Y) from the difference unit 33.

The amplifier 38 amplifies the voltage signal from the low pass filter 36 with a predetermined gain, and the amplified voltage signal, i.e., the corrected voltage signal (X) is applied to the solenoid 53(X) of the disk driver 25 (the amplifier 38 output (at t1) in FIG. 7).

The amplifier 39 amplifies the voltage signal from the low pass filter 37 with the predetermined gain, and the amplified voltage signal, i.e., the corrected voltage signal (Y) is applied to the solenoid 53(Y) of the disk driver 25 (the amplifier 39 output (at t1) in FIG. 7).

When having the corrected voltage signal (X) from the amplifier 38 applied thereto, the solenoid 53(X) pushes up the rotator support plate 58 in the +Y3 direction to place the medium 22 in the reference position A. Since the rotator support plate 58 is pushed up, the end face 22(a) of the disk medium 22 is pushed up while the end face 22(b) is pulled down.

When having the corrected voltage signal (Y) from the amplifier 39 applied thereto, the solenoid 53(Y) pushes up the rotator support plate 58 in the +Y3 direction to place the medium 22 in the reference position A. Since the rotator support plate 58 is pushed up, the end face 22(c) of the disk medium 22 is pushed up while the end face 22(d) is pulled down.

As a result, the correction of the position of the tilted disk medium 22 to the reference position A is complete. Thus, the data beam and the reference beam for forming a hologram can be made incident on the disk medium 22 at an accurate incident angle.

In order to form a first page (first hologram) in the disk medium 22, the CPU 1 calculates a recording laser beam irradiation time T1 for the first page. Then, the CPU 1 sends the TFF 48 the trigger signal (trigger signal (at t2) in FIG. 7) and the second shutter control unit 15 an instruction signal to open the second shutter 14. Also the CPU 1 starts the time count of the first timer 49.

The encoder 7 encodes data from the buffer 5.

The mapping process unit 8 rearranges the data from the encoder 7 in a two-dimensional data array to form page unit array data. The mapping process unit 8 forms page unit array data from 1.6 Mbits of data (1280 bits by 1280 bits), and hence, if the data to be recorded in the disk medium 22 from the host equipment is of three Mbits, the mapping process unit 8 sequentially forms page unit array data at least twice.

The SLM 9 forms a two-dimensional contrast image pattern (1280 pixels down by 1280 pixels across) from the page unit array data formed by the mapping process unit 8. For example, the SLM 9 assigns 'lightness' to one of the logical values of the data bits of the page unit array data and 'darkness' to the other logical value to form a two-dimensional contrast image pattern.

When receiving the trigger signal from the CPU 1, the TFF 48 outputs a high level through the Q terminal to open (turn ON) the first shutter 11 (first shutter (at t2) in FIG. 7). The first shutter 11 is open while a high level is output from the TFF 48. As the first shutter 11 is open, the laser beam from the laser device 10 strikes the ½ wavelength plate 31 via the first shutter 11.

The PBS 13 splits the laser beam from the ½ wavelength plate 31 into one laser beam and the reference beam and makes the one laser beam incident on the second shutter 14 and the reference beam incident on the galvo mirror 16.

The second shutter control unit 15 sends an open instruction signal to the second shutter 14 according to the instruction signal from the CPU 1 (second shutter open instruction signal (at t2) in FIG. 7).

The second shutter 14 opens (turns ON) on the basis of the open instruction signal from the second shutter control unit 15 (second shutter (at t2) in FIG. 7). As the second shutter 14 is open, the one laser beam from the PBS 13 is incident on the SLM 9.

When the one laser beam strikes the SLM 9, the one laser beam is reflected by the SLM 9 to the Fourier transform lens 21 as the reflected beam reflecting information of the two-dimensional contrast image pattern formed in the SLM 9.

The data beam from the SLM 9 is condensed and Fourier-transformed by the Fourier transform lens 21, and then made incident on the disk medium 22.

The galvo mirror control unit 17 adjusts the angle of the galvo mirror 16 according to an instruction signal from the CPU 1 so as to adjust the angle at which the reference beam reflected by the galvo mirror 16 is incident on the disk medium 22 via the dichroic mirror 18 and the scanner lens 20. At this time, the galvo mirror 16 is adjusted in angle by the galvo mirror control unit 17 so as to form the first page in the disk medium 22. The reference beam from the PBS 13 is reflected by the galvo mirror 16 adjusted in angle by the galvo mirror control unit 17 to the dichroic mirror 18.

The reference beam incident on the dichroic mirror 18 then passes through the dichroic mirror 18 and strikes the scanner lens 20. Note that the servo laser beam emitted from the servo laser device 19 is superimposed over the reference beam and made incident on the scanner lens 20.

The scanner lens 20 refracts the reference beam and the servo laser beam from the dichroic mirror 18 to strike the disk medium 22.

As a result, the data beam and the reference beam are made incident on the disk medium 22 placed in the reference position A, thereby starting the formation of the first page of hologram.

A description will be made of, e.g., the case where vibration occurs in the disk medium 22 during the formation of the first page of hologram.

Part of the servo laser beam having the reference beam superimposed thereon and being incident on the disk medium 22 is reflected by the disk medium 22 vibrating and strikes the PSD 52.

Part of the servo laser beam reflected by the disk medium 22 vibrating is made incident on the light reception surface 52(a) of the PSD 52. The PSD 52 outputs the analog electric signal (X) corresponding to the position in the X2 direction at which the servo laser beam is received to the difference unit 32 and the band pass filter 59. The PSD 52 also outputs the analog electric signal (Y) corresponding to the position in the Y2 direction at which the servo laser beam is received to the difference unit 33 and the band pass filter 60.

Based on the analog electric signal (X) output to the difference unit 32 and the analog electric signal (Y) output to the difference unit 33, the tilt of the disk medium 22 is corrected as described above, and hence, description thereof is unwarranted.

The band pass filter 59 outputs only components having a frequency within the predetermined frequency band of the analog electric signal (X) from the PSD 52 to the vibration amount detector 40.

The vibration amount detector 40 outputs to the comparator 44 an amplitude voltage (X) corresponding to the amplitude of the analog electric signal (X) based on the analog electric signal (X) from the band pass filter 59. This amplitude voltage (X) is at a level corresponding to the distance between the position at which the servo laser beam is received when the medium 22 is in the reference position A and that position for the medium 22 vibrating, and corresponds to the magnitude of the vibration.

The band pass filter 60 outputs only components having a frequency within the predetermined frequency band of the analog electric signal (Y) from the PSD 52 to the vibration amount detector 41.

The vibration amount detector 41 outputs to the comparator 45 an amplitude voltage (Y) corresponding to the amplitude of the analog electric signal (Y) based on the analog electric signal (Y) from the bandpass filter 60. This amplitude voltage (Y) is at a level corresponding to the distance between the position at which the servo laser beam is received when the medium 22 is in the reference position A and that position for the medium 22 vibrating, and corresponds to the magnitude of the vibration.

The comparator 44 compares the amplitude voltage (X) from the vibration amount detector 40 with the reference voltage Vref(X) from the reference vibration amount voltage generator 42, and if the amplitude voltage (X) is higher than the reference voltage Vref(X), outputs the one logic value '1' to the OR circuit 46 and the CPU 1. In this implementation, it is supposed that at t3 in FIG. 7, the amplitude voltage (X) becomes higher than the reference voltage Vref(X) and thus, the comparator 44 outputs the one logic value '1'.

The comparator 45 compares the amplitude voltage (Y) from the vibration amount detector 41 with the reference voltage Vref(Y) from the reference vibration amount voltage generator 43, and if the amplitude voltage (Y) is higher than the reference voltage Vref(Y), outputs the one logic value '1' to the OR circuit 46 and the CPU 1. In this implementation, it is supposed that at t3 in FIG. 7, the amplitude voltage (Y) becomes higher than the reference voltage Vref(Y) and thus, the comparator 45 outputs the one logic value '1'.

The CPU 1 stops the time count of the first timer 49 on the basis of the one logic value '1' from the comparators 44, 45.

Furthermore, the OR circuit 46 outputs the one logic value '1' to the OR circuit 47 on the basis of the one logic value '1' from the comparators 44, 45.

The OR circuit 47 outputs the one logic value '1' to the TFF 48 on the basis of the one logic value '1' from the OR circuit 46.

The TFF 48 outputs a low level through the Q terminal to close (turn OFF) the first shutter 11 (first shutter (at t3) in FIG. 7) on the basis of the one logic value '1' from the OR circuit 47. Since the first shutter 11 is closed, the irradiation of the data beam and the reference beam onto the disk medium 22 is cut off.

When, as above, the amplitude voltages (X) and (Y) produced by vibration that is occurring in the disk medium 22 become higher than the reference voltages Vref(X) and Vref(Y) respectively, by closing the first shutter 11, the irradiation of the data beam and the reference beam onto the disk medium 22 can be cut off. Thus, vibration that is occurring in the disk medium 22 is prevented from causing a hologram to be formed to have diffraction efficiency of less than the specified value. In this implementation, the case where the amplitude voltages (X) and (Y) become higher than the reference voltages Vref(X) and Vref(Y) respectively has been described, but the first shutter 11 may be closed also when only the amplitude voltage (X) become higher than the reference voltage Vref(X) or when only the amplitude voltage (Y) become higher than the reference voltage Vref(Y).

Next, a description will be made of the case where vibration occurring in the disk medium 22 gradually subsides and the amplitude voltage (Y) becomes lower than the reference voltage Vref(Y) (at t4 in FIG. 7) and the amplitude voltage (X) becomes lower than the reference voltage Vref(X) (at t5 in FIG. 7).

When the amplitude voltage (Y) from the vibration amount detector 41 is lower than the reference voltage Vref(Y) from the reference vibration amount voltage generator 43 (at t4 in FIG. 7), the comparator 45 outputs the other logic value '0' to the OR circuit 46 and the CPU 1. That is, it is seen that the vibration occurring in the Y1 direction in the disk medium 22 has come to be of within the above-mentioned tolerance range for the formation of a hologram.

When the other logic value '0' from the comparator 45 is input thereto, the CPU 1 starts the time count of the third timer 51, and determines whether the time count of the third timer 51 has reached a predetermined time period t(Y).

Although the other logic value '0' from the comparator 45 is input thereto, the OR circuit 46 continues to output the one logic value '1' to the OR circuit 47 with the one logic value '1' from the comparator 44 input thereto continuously.

The OR circuit 47 continues to output the one logic value '1' to the TFF 48 on the basis of the one logic value '1' from the OR circuit 46.

The TFF 48 continues to output the low level through the Q terminal to keep the first shutter 11 closed on the basis of the one logic value '1' from the OR circuit 47. Thus, the first shutter 11 remains closed (between t4 and t5 in FIG. 7), the irradiation of the data beam and the reference beam onto the disk medium 22 continues to be cut off.

When the amplitude voltage (X) from the vibration amount detector 40 is lower than the reference voltage Vref(X) from the reference vibration amount voltage generator 42 (at t5 in FIG. 7), the comparator 44 outputs the other logic value '0' to the OR circuit 46 and the CPU 1. That is, it is seen that the vibration occurring in the X1 direction in the disk medium 22 has come to be of within the above-mentioned tolerance range for the formation of a hologram.

When the other logic value '0', from the comparator 44 is input thereto, the CPU 1 starts the time count of the second timer 50, and determines whether the time count of the second timer 50 has reached a predetermined time period t(X).

The OR circuit 46 outputs the other logic value '0' to the OR circuit 47 on the basis of the other logic value '0' from the comparators 44, 45.

The OR circuit 47 outputs the other logic value '0' to the TFF 48 on the basis of the other logic value '0' from the OR circuit 46.

Since the other logic value '0' from the OR circuit 47 is input thereto, the TFF 48 continues to output the low level through the Q terminal.

When the CPU 1 determines that the time count of the third timer has reached the predetermined time period t(Y) (at t6 in FIG. 7) and that the time count of the second timer has reached the predetermined time period t(X), the CPU 1 sends the TFF 48 the trigger signal (trigger signal (at t7) in FIG. 7) and starts the time count of the first timer 49 again.

When receiving the trigger signal from the CPU 1, the TFF 48 outputs the high level through the Q terminal to open (turn ON) the first shutter 11 (first shutter (at t7) in FIG. 7). As a result, the data beam and the reference beam are again irradiated onto the disk medium 22 to form the first page of hologram in the disk medium 22.

When determining that the time count of the first timer has reached the calculated recording laser beam irradiation time T1 (T1(a)+T1(b) in FIG. 7), the CPU 1 sends the one logic value '1' to the OR circuit 47. As a result, the first page of hologram having the specified value of diffraction efficiency is formed in the disk medium 22.

The OR circuit 47 outputs the one logic value '1' to the TFF 48 on the basis of the one logic value '1' from the CPU 1.

The TFF 48 outputs the low level through the Q terminal to close (turn OFF) the first shutter 11 (first shutter (at t8) in FIG. 7) on the basis of the one logic value '1', from the OR circuit 47. Since the first shutter 11 is closed, the irradiation of the data beam and the reference beam onto the disk medium 22 is cut off.

Next, the CPU 1 sends an instruction signal (galvo mirror control unit 17 instruction signal (at t8) in FIG. 7) to the galvo mirror control unit 17 so that the reference beam is incident at an incident angle for a second page (second hologram) to form the second page in the disk medium 22. Further, the CPU 1 calculates a recording laser beam irradiation time T2 for the second page. Then, the CPU 1 sends the TFF 48 the trigger signal (trigger signal (at t9) in FIG. 7), and resets and starts the time count of the first timer 49.

Then the second page is formed in the disk medium 22 like the first page is.

When determining that the time count of the first timer 49 has reached the calculated recording laser beam irradiation time T2 (T2(a)+T2(b) in FIG. 7), the CPU 1 sends the one logic value '1' to the OR circuit 47 and an instruction signal to close the second shutter 14 to the second shutter control unit 15. As a result, the second page of hologram having the specified value of diffraction efficiency is formed in the disk medium 22, and that number of holograms in page units (first and second holograms), which number has been calculated based on information of the data amount from the reproduction/recording determination unit 6, have been formed in the disk medium 22.

The second shutter control unit 15 sends a close instruction signal to the second shutter 14 according to an instruction signal from the CPU 1 (second shutter close instruction signal (at t10) in FIG. 7).

The second shutter 14 closes according to the close instruction signal from the second shutter control unit 15 (second shutter (at t10) in FIG. 7).

Therefore, the effect of vibration of the disk medium 22 relative to the reference position A on recording holograms can be prevented, and thus holograms having the specified value of diffraction efficiency can be formed. Furthermore, the position of the disk medium 22 tilted due to vibration can be corrected to the reference position A, and the data beam and the reference beam to form a hologram can be made incident at an accurate incident angle on the disk medium 22.

===Operation (Reproducing) of Tilt Detection Apparatus/Hologram Apparatus===

Figure 8:
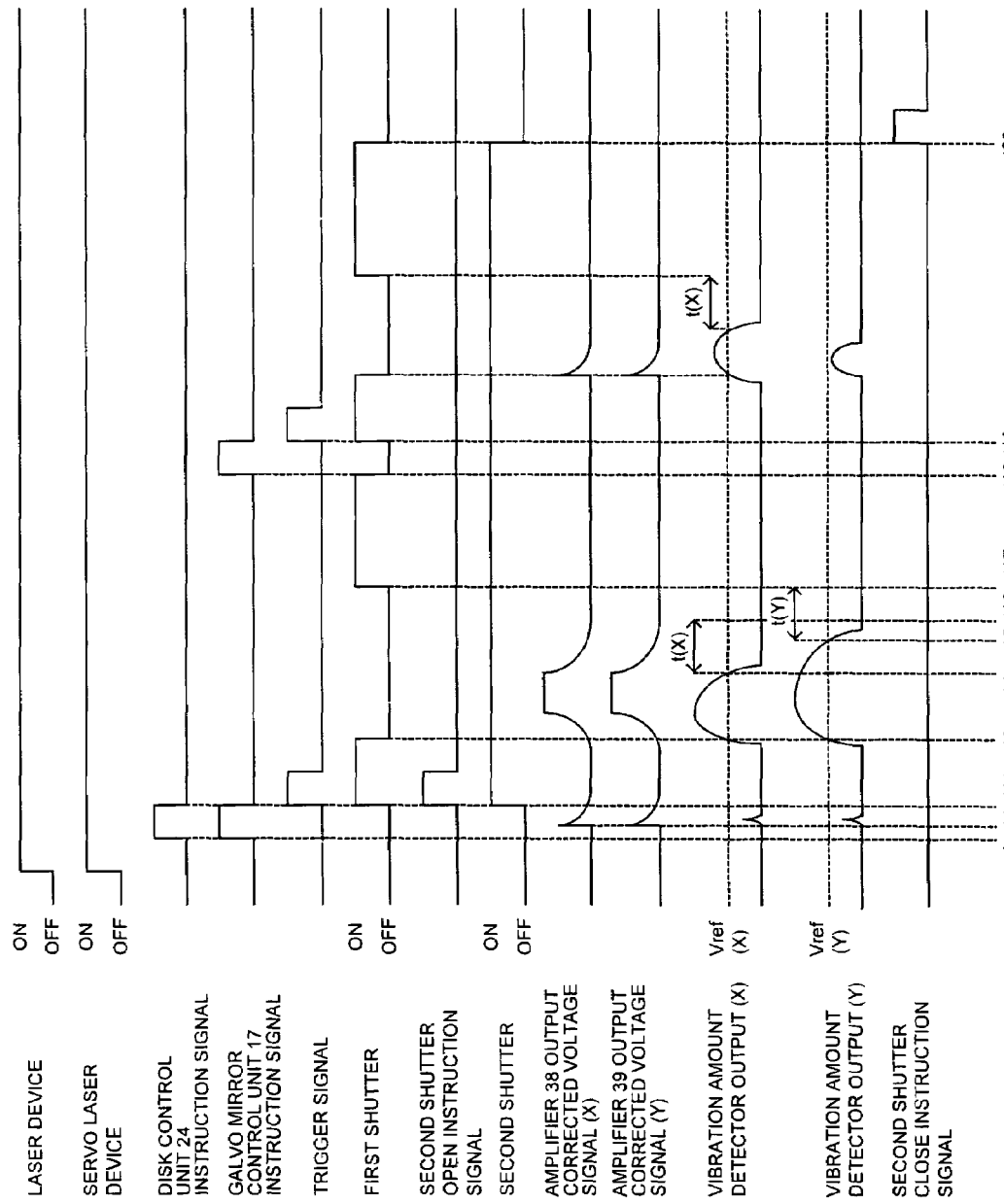
FIG. 8 is a timing chart illustrating an example of the operation in hologram reproducing of the tilt detection apparatus/hologram apparatus according to the present invention.

A description will be provided below of the operation in reproducing of the tilt detection apparatus/hologram apparatus according to the invention with reference to FIGS. 1, 6, 8 and 10. FIG. 8 is a timing chart illustrating an example of the operation of the tilt detection apparatus/hologram apparatus according to the present invention.

For example, when reproducing instruction data is stored in the buffer 5 from the host equipment such as a PC via the connection terminal 4 and the interface 3, the reproduction/recording determination unit 6 determines that the reproducing instruction data is stored in the buffer 5. Then, the reproduction/recording determination unit 6 sends an instruction signal to carry out the reproducing process in the hologram apparatus. Suppose that the reproducing instruction data is, e.g., reproducing instruction data to reproduce the first and second holograms.

Upon receiving an instruction signal based on the reproducing instruction data from the reproduction/recording determination unit 6, the CPU 1 reads address information of the first and second holograms (hereinafter called reproducing-address information) from among the address information stored in the memory 2. Then, the CPU 1 sends an instruction signal to the disk control unit 24 (disk control unit 24 instruction signal (at t10) in FIG. 8) to reproduce holograms from the position of the disk medium 22 where the reproducing-address information is formed in the form of pits.

The servo laser device 19 starts to emit the servo laser beam (as denoted by servo laser device in FIG. 8) when the tilt detection apparatus/hologram apparatus starts its operation. This servo laser beam is reflected by the dichroic mirror 18 to strike the scanner lens 20. The servo laser beam incident on the scanner lens 20 is then irradiated onto the pits representing the address information formed on the disk medium 22 and strikes the detector 23. Part of the servo laser beam is reflected by the disk medium 22 and strikes the PSD 52.

The detector 23 sends the CPU 1 the address information based on the servo laser beam incident on the four-section photodetector (not shown).

The CPU 1 determines based on the address information from the detector 23 whether the address information represents the reproducing-address information. If determining that the address information does not represent the reproducing-address information, the CPU 1 sends an instruction signal to the disk control unit 24 to rotate the disk medium 22 and irradiate the servo laser beam onto pits representing the reproducing-address information.

The disk control unit 24 sends an instruction signal to the disk driver 25 according to the instruction signal from the CPU 1 to rotate the disk medium 22.

The disk driver 25 rotates the disk medium 22 according to the instruction signal from the disk control unit 24 so as to make the servo laser beam onto the pits representing the reproducing-address information.

A description will be made of the case where the support 57 of the disk driver 25 is not precisely inserted in the central opening of the disk medium 22 and the disk medium 22 is tilted in the X1 and Y1 directions.

Part of the servo laser beam reflected by the tilted disk medium 22 is made incident on the light reception surface 52(a) of the PSD 52. The PSD 52 outputs the analog electric signal (X) corresponding to the position in the X2 direction at which the servo laser beam is received to the difference unit 32 and the band pass filter 59. The PSD 52 also outputs the analog electric signal (Y) corresponding to the position in the Y2 direction at which the servo laser beam is received to the difference unit 33 and the band pass filter 60.

The difference unit 32 outputs to the low pass filter 36 the difference voltage signal (X) indicating the difference between the analog electric signal (X) from the PSD 52 and the reference analog electric signal (X) from the reference voltage generator 34. Because the disk medium 22 is tilted in the X1 direction, the difference voltage signal (X) is at a level corresponding to the distance between the position at which the servo laser beam is received when the medium 22 is in the reference position A and that position for the medium 22 being tilted.

The difference unit 33 outputs to the low pass filter 37 the difference voltage signal (Y) indicating the difference between the analog electric signal (Y) from the PSD 52 and the reference analog electric signal (Y) from the reference voltage generator 35. Because the disk medium 22 is tilted in the Y1 direction, the difference voltage signal (Y) is at a level corresponding to the distance between the position at which the servo laser beam is received when the medium 22 is in the reference position A and that position for the medium 22 being tilted.

The low pass filter 36 passes to the amplifier 38 only components having a frequency lower than a predetermined frequency of the difference voltage signal (X) from the difference unit 32.

The low pass filter 37 passes to the amplifier 39 only components having a frequency lower than the predetermined frequency of the difference voltage signal (Y) from the difference unit 33.

The amplifier 38 amplifies the voltage signal from the low pass filter 36 with the predetermined gain, and the amplified voltage signal, i.e., the corrected voltage signal (X) is applied to the solenoid 53(X) of the disk driver 25 (the amplifier 38 output (at t11) in FIG. 8).

The amplifier 39 amplifies the voltage signal from the low pass filter 37 with the predetermined gain, and the amplified voltage signal, i.e., the corrected voltage signal (Y) is applied to the solenoid 53(Y) of the disk driver 25 (the amplifier 39 output (at t11) in FIG. 8).

When having the corrected voltage signal (X) from the amplifier 38 applied thereto, the solenoid 53(X) pushes up the rotator support plate 58 in the +Y3 direction to place the medium 22 in the reference position A. Since the rotator support plate 58 is pushed up, the end face 22(a) of the disk medium 22 is pushed up while the end face 22(b) is pulled down.

When having the corrected voltage signal (Y) from the amplifier 39 applied thereto, the solenoid 53(Y) pushes up the rotator support plate 58 in the +Y3 direction to place the medium 22 in the reference position A. Since the rotator support plate 58 is pushed up, the end face 22(c) of the disk medium 22 is pushed up while the end face 22(d) is pulled down.

As a result, the correction of the position of the tilted disk medium 22 to the reference position A is complete. Thus, the data beam and the reference beam for reproducing the first and second holograms can be made incident on the disk medium 22 at an accurate incident angle.

In order to reproduce the first hologram first, the CPU 1 calculates a reproducing laser beam irradiation time T1 for the first hologram. Then, the CPU 1 sends an instruction signal (galvo mirror control unit 17 instruction signal (at t10) in FIG. 8) to the galvo mirror control unit 17 so that the reference beam is incident on the first hologram. Also, the CPU 1 sends the TFF 48 the trigger signal and starts the time count of the first timer 49.

When receiving the trigger signal from the CPU 1, the TFF 48 outputs the high level through the Q terminal to open (turn ON) the first shutter 11 (first shutter (at t12) in FIG. 8). The first shutter 11 is open while the high level is output from the TFF 48. As the first shutter 11 is open, the laser beam from the laser device 10 strikes the ½ wavelength plate 31 via the first shutter 11.

The ½ wavelength plate 31 makes the laser beam from the laser device 10 incident at a predetermined angle on the PBS 13.

The PBS 13 splits the laser beam from the ½ wavelength plate 31 into one laser beam and the reference beam and makes the one laser beam incident on the second shutter 14 and the reference beam incident on the galvo mirror 16. Note that because the second shutter 14 is closed, the incidence of the one laser beam on the SLM 9 is cut off.

The galvo mirror control unit 17 adjusts the angle of the galvo mirror 16 according to an instruction signal from the CPU 1 so as to adjust the angle at which the reference beam reflected by the galvo mirror 16 is incident on the disk medium 22 via the dichroic mirror 18 and the scanner lens 20. At this time, the galvo mirror 16 is adjusted in angle by the galvo mirror control unit 17 so as to make the reference beam incident on the first page. The reference beam from the PBS 13 is reflected by the galvo mirror 16 adjusted in angle by the galvo mirror control unit 17 to the dichroic mirror 18.

The reference beam incident on the dichroic mirror 18 passes through the dichroic mirror 18, and is incident on the scanner lens 20. The servo laser beam emitted from the servo laser device 19 has the reference beam superimposed thereon and is incident on the scanner lens 20.

The scanner lens 20 refracts the reference beam and the servo laser beam from the dichroic mirror 18 to be incident on the disk medium 22.

The reference beam incident on the first hologram is diffracted by the interference fringes representing the first hologram and incident as a reproducing beam on the Fourier transform lens 26. This reproducing beam reflects the two-dimensional contrast image pattern of the first hologram.

The Fourier transform lens 26 makes the inverse-Fourier-transformed, reproducing beam incident on the image sensor 27.

The image sensor 27 placed at a given position by the control of the image sensor control unit 28 reproduces the two-dimensional contrast image pattern of the first hologram based on the reproducing beam from the Fourier transform lens 26. The image sensor control unit 28 determines whether the reproducing beam incident on the image sensor 27 is below a predetermined light intensity. In this implementation, here, it is supposed that the image sensor control unit 28 does not determine that the reproducing beam incident on the image sensor 27 is at or above a predetermined light intensity.

As a result, the reference beam is made incident on the disk medium 22 positioned in the reference position A and the reproduction of the first hologram is started.

A description will be made of the case where vibration occurs in the disk medium 22 during the reproduction of the first hologram.

Part of the servo laser beam having the reference beam superimposed thereon incident on the disk medium 22 is reflected by the vibrating disk medium 22 to be incident on the PSD 52.

The part of the servo laser beam reflected by the disk medium 22 vibrating is made incident on the light reception surface 52(a) of the PSD 52. The PSD 52 outputs the analog electric signal (X) corresponding to the position in the X2 direction at which the servo laser beam is received to the difference unit 32 and the band pass filter 59. Also, the PSD 52 outputs the analog electric signal (Y) corresponding to the position in the Y2 direction at which the servo laser beam is received to the difference unit 33 and the band pass filter 60. Note that by using the analog electric signal (X) output to the difference unit 32 and the analog electric signal (Y) output to the difference unit 33, the tilt of the disk medium 22 due to vibration is corrected as above, and hence, description thereof is unwarranted.

The band pass filter 59 outputs only components having a frequency within the predetermined frequency band of the analog electric signal (X) from the PSD 52 to the vibration amount detector 40.

The vibration amount detector 40 outputs to the comparator 44 the amplitude voltage (X) corresponding to the amplitude of the analog electric signal (X) based on the analog electric signal (X) from the band pass filter 59. This amplitude voltage (X) is at a level corresponding to the distance between the position at which the servo laser beam is received when the medium 22 is in the reference position A and that position for the medium 22 vibrating, and corresponds to the magnitude of the vibration.

The band pass filter 60 outputs only components having a frequency within the predetermined frequency band of the analog electric signal (Y) from the PSD 52 to the vibration amount detector 41.

The vibration amount detector 41 outputs to the comparator 45 the amplitude voltage (Y) corresponding to the amplitude of the analog electric signal (Y) based on the analog electric signal (Y) from the band pass filter 60. This amplitude voltage (Y) is at a level corresponding to the distance between the position at which the servo laser beam is received when the medium 22 is in the reference position A and that position for the medium 22 vibrating, and corresponds to the magnitude of the vibration.

The comparator 44 compares the amplitude voltage (X) from the vibration amount detector 40 with the reference voltage Vref(X) from the reference vibration amount voltage generator 42, and if the amplitude voltage (X) is higher than the reference voltage Vref(X), outputs the one logic value '1' to the OR circuit 46 and the CPU 1. In this implementation, here, it is supposed that at t3 in FIG. 8, the amplitude voltage (X) becomes higher than the reference voltage Vref(X) and thus, the comparator 44 outputs the one logic value '1'.

The comparator 45 compares the amplitude voltage (Y) from the vibration amount detector 41 with the reference voltage Vref(Y) from the reference vibration amount voltage generator 43, and if the amplitude voltage (Y) is higher than the reference voltage Vref(Y), outputs the one logic value '1' to the OR circuit 46 and the CPU 1. In this implementation, here, it is supposed that at t3 in FIG. 8, the amplitude voltage (Y) becomes higher than the reference voltage Vref(Y) and thus, the comparator 45 outputs the one logic value '1'.

The CPU 1 stops the time count of the first timer 49 on the basis of the one logic value '1' from the comparators 44, 45.

Furthermore, the OR circuit 46 outputs the one logic value '1' to the OR circuit 47 on the basis of the one logic value '1' from the comparators 44, 45.

The OR circuit 47 outputs the one logic value '1' to the TFF 48 on the basis of the one logic value '1' from the OR circuit 46.

The TFF 48 outputs a low level through the Q terminal to close (turn OFF) the first shutter 11 (first shutter (at t13) in FIG. 8) on the basis of the one logic value '1' from the OR circuit 47. Since the first shutter 11 is closed, the irradiation of the reference beam onto the disk medium 22 is cut off.

When as above, the amplitude voltages (X) and (Y) produced by vibration that is occurring in the disk medium 22 become higher than the reference voltages Vref(X) and Vref(Y) respectively, by closing the first shutter 11, the irradiation of the reference beam onto the disk medium 22 can be cut off. Thus, vibration that is occurring in the disk medium 22 is prevented from causing a hologram different from the first hologram to be reproduced. In this implementation, the case where the amplitude voltages (X) and (Y) become higher than the reference voltages Vref(X) and Vref(Y) respectively has been described, but the first shutter 11 may be closed also when only the amplitude voltage (X) become higher than the reference voltage Vref(X) or when only the amplitude voltage (Y) become higher than the reference voltage Vref(Y).

Next, a description will be made of the case where vibration occurring in the disk medium 22 gradually subsides and the amplitude voltage (X) becomes lower than the reference voltage Vref(X) (at t14 in FIG. 8) and the amplitude voltage (Y) becomes lower than the reference voltage Vref(Y) (at t15 in FIG. 8).

When the amplitude voltage (X) from the vibration amount detector 40 is lower than the reference voltage Vref(X) from the reference vibration amount voltage generator 42 (at t14 in FIG. 8), the comparator 44 outputs the other logic value '0' to the OR circuit 46 and the CPU 1. That is, it is seen that the vibration occurring in the X1 direction in the disk medium 22 has come to be of within a range that enables the reproduction of the first hologram.

When the other logic value '0' from the comparator 44 is input thereto, the CPU 1 starts the time count of the second timer 50, and determines whether the time count of the second timer 50 has reached a predetermined time period t(X).

Although the other logic value '0' from the comparator 44 is input thereto, the OR circuit 46 continues to output the one logic value '1' to the OR circuit 47 with the one logic value '1' from the comparator 45 input thereto continuously.

The OR circuit 47 continues to output the one logic value '1' to the TFF 48 on the basis of the one logic value '1' from the OR circuit 46.

The TFF 48 continues to output the low level through the Q terminal to keep the first shutter 11 closed on the basis of the one logic value '1' from the OR circuit 47. Thus, the first shutter 11 remains closed (between t14 and t15 in FIG. 8), the irradiation of the reference beam onto the disk medium 22 continues to be cut off.

When the amplitude voltage (Y) from the vibration amount detector 41 is lower than the reference voltage Vref(Y) from the reference vibration amount voltage generator 43 (at t15 in FIG. 8), the comparator 45 outputs the other logic value '0' to the OR circuit 46 and the CPU 1. That is, it is seen that the vibration occurring in the Y1 direction in the disk medium 22 has come to be of within a range that enables the reproduction of the first hologram.

When the other logic value '0' from the comparator 44 is input thereto, the CPU 1 starts the time count of the third timer 51, and determines whether the time count of the third timer 51 has reached a predetermined time period t(Y).

On the basis of the other logic value '0' from the comparator 45 and from the comparator 44, the OR circuit 46 outputs the other logic value '0' to the OR circuit 47.

The OR circuit 47 outputs the other logic value '0' to the TFF 48 on the basis of the other logic value '0' from the OR circuit 46.

The TFF 48 continues to output the low level through the Q terminal with the other logic value '0' from the OR circuit 47 inputted thereto.

When determining that the time count of the second timer 50 has reached the predetermined time period t(X) (at t16 in FIG. 8) and the time count of the third timer 51 has reached the predetermined time period-t(Y), the CPU 1 sends a trigger signal to the TFF 48 (at t17 in FIG. 8) and starts the time count of the first timer 49 again.

When receiving the trigger signal from the CPU 1, the TFF 48 outputs the high level through the Q terminal to open (turn ON) the first shutter 11 (first shutter (at t17) in FIG. 8). As a result, the reference beam is again incident on the disk medium 22 to reproduce the first hologram.

When determining that the time count of the first timer 49 has reached the calculated reproducing laser beam irradiation time T1 (T1(c) +T1(d) in FIG. 8), the CPU 1 sends the one logic value '1' to the OR circuit 47. This means that the light amount of the reproducing beam having entered the image sensor 27 has reached a predetermined light amount, and the two-dimensional contrast image pattern of the first hologram is reproduced by the image sensor 27.

The image sensor 27 converts lightness/darkness in the reproduced two-dimensional contrast image pattern to being strong/weak in electric signal intensity and sends to the filter 29 an analog electric signal having levels corresponding to the light intensities of lightness and darkness in the two-dimensional contrast image pattern.

The filter 29 filters the analog electric signal that is based on the lightness/darkness in the two-dimensional contrast image pattern reproduced by the image sensor 27 to enhance the separability in the binarization process, and sends to a binarization process unit (not shown). Note that the binarization process unit is provided in between the filter 29 and the decoder 30 to binarize the analog electric signal from the filter 29.

The decoder 30 decodes the digital signal from the binarization process unit. The digital signal decoded in the decoder 30 is sent to the host equipment and the like via the buffer 5 and the interface 3.

The OR circuit 47 outputs the one logic value '1' to the TFF 48 on the basis of the one logic value '1' from the OR circuit 46.

The TFF 48 outputs the low level through the Q terminal to close (turn OFF) the first shutter 11 (first shutter (at t18) in FIG. 8) on the basis of the one logic value '1' from the OR circuit 47. Since the first shutter 11 is closed, the irradiation of the reference beam onto the disk medium 22 is cut off.

As a result, data of the first hologram has been reproduced.

Next, in order to reproduce the second hologram, the CPU 1 sends an instruction signal (galvo mirror control unit instruction signal (at t18) in FIG. 8) to the galvo mirror control unit 17 to make the reference beam incident on the second hologram at an incident angle for the second hologram. Also, the CPU 1 calculates a reproducing laser beam irradiation time T2 for the second hologram, and sends the TFF 48 the trigger signal (trigger signal (at t19) in FIG. 8) and resets and starts the first timer 49.

Then, the second hologram is reproduced from the disk medium 22 in the same way as the first hologram is reproduced in the above.

When determining that the time count of the first timer 49 has reached the calculated reproducing laser beam irradiation time T2 (T2(c)+T2(d) in FIG. 8), the CPU 1 sends the one logic value '1' to the OR circuit 47 and an instruction signal to the second shutter control unit 15 to close the second shutter 14. As a result, data has been reproduced according to the reproducing instruction data stored in the buffer 5 to reproduce the first and second holograms.

The second shutter control unit 15 sends a close instruction signal to the second shutter 14 according to the instruction signal from the CPU 1 (second shutter close instruction signal (at t20) in FIG. 8).

The second shutter 14 is closed on the basis of the close instruction signal from the second shutter control unit 15 (second shutter (at t20) in FIG. 8).

As a result, when reproducing holograms, the effect of vibration of the disk medium 22 with respect to the reference position A can be prevented, thereby enabling reproducing data of the holograms to be reproduced. Moreover, the position of the disk medium 22 tilted due to vibration can be corrected to the reference position A, and the reference beam to form a hologram can be made incident at an accurate incident angle on the disk medium 22.

According to the above implementation, when the disk medium 22 is tilted with respect to the reference position A, the tilt of the disk medium 22 can be corrected. As a result, the data beam and the reference beam can be made incident on the disk medium 22 in the reference position A. With controlling the consumption of monomers, holograms having a specified value of diffraction efficiency can be formed. That is, the formation of erroneous holograms in the disk medium 22 due to the tilt can be prevented.

Furthermore, when the disk medium 22 is tilted with respect to the reference position A, the tilt of the disk medium 22 can be corrected. As a result, the reference beam can be made incident on the disk medium 22 in the reference position A, and data can be reproduced based on the reference beam (reproducing beam) diffracted by a hologram. That is, the reproduction of data based on the reference beam (reproducing beam) diffracted by an erroneous hologram due to the tilt can be prevented.

Yet further, when such vibration is occurring that the amplitude voltages (X), (Y) are higher than the reference voltages Vref (X), Vref (Y), the irradiation of at least one of the data beam and the reference beam onto the disk medium 22 can be cut off. As a result, the data beam and the reference beam can be made incident on the disk medium 22 when the amplitude voltages are lower than the reference voltages Vref (X), Vref(Y), and with controlling the consumption of monomers, holograms having a specified value of diffraction efficiency can be formed. That is, the formation of erroneous holograms in the disk medium 22 due to the vibration that produces the amplitude voltages no lower than the reference voltages Vref(X), Vref(Y) can be prevented.

Still further, when vibration that produces the amplitude voltages no lower than the reference voltages Vref(X), Vref (Y) is occurring, the irradiation of the reference beam onto the disk medium 22 can be cut off. The reference beam is made incident on the disk medium 22 when the amplitude voltages are lower than the reference voltages Vref (X), Vref (Y), and data can be reproduced based on the reference beam (reproducing beam) diffracted by a hologram. The reproduction of data based on the reference beam (reproducing beam) diffracted by an erroneous hologram due to the effect of vibration that produces the amplitude voltages no lower than the reference voltages Vref(X), Vref(Y) can be prevented.

By setting the distance between the PSD 52 and the disk medium 22 to which the difference voltages (X), (Y) correspond to be close to the shortest distance in terms of the capability of the difference units 32, 33, even minute tilts of the disk medium 22 can be detected. And the disk medium 22 can be driven and adjusted in position to the reference position A more certainly based on the difference voltages (X), (Y) from the difference units 32, 33. As a result, when recording holograms, the disk medium 22 can be accurately positioned in the reference position A to form holograms therein. When reproducing holograms, the disk medium 22 can be accurately positioned in the reference position A to reproduce data from it.

Moreover, by making the servo laser beam incident on the periphery of a disk surface of the disk medium 22, the tilt of the disk medium 22 can be detected certainly. When the disk medium 22 is vibrating, the servo laser beam is incident on the periphery of the disk medium 22, on which the effect of the vibration appears more clearly, and hence, vibration amount can be detected certainly by the vibration amount detectors 40, 41.

The respective tilts of the disk medium 22 in the X1 and Y1 directions can be corrected. As a result, when recording holograms, the disk medium 22 can be accurately positioned in the reference position A to form holograms therein. When reproducing holograms, the disk medium 22 can be accurately positioned in the reference position A to reproduce data from it.

For disk media 22 that reflect the servo laser beam, the invention can be used. The tilts and vibration of the disk media 22 and vibration of the tilt detection apparatus/hologram apparatus can be detected.

In this implementation the correction of the tilt and vibration of the disk medium 22 is realized by hardware implemented as the analog circuitry, that is, the difference units 32, 33, the reference voltage generators 34, 35, the low pass filters 36, 37, the amplifiers 38, 39, the vibration amount detectors 40, 41, the reference vibration amount voltage generators 42, 43, the comparators 44, 45, the OR circuits 46, 47, the TFF 48, and the band pass filters 59, 60, but the present invention is not limited to this. For example, a DSP (Digital Signal Processor) may be provided and, having the analog electric signals (X), (Y) from the PSD 52 converted by an ADC (Analog Digital Converter) into digital data, the above processes may be implemented by software executed by the DSP.

While description has been made of the disk medium 22 capable of forming holograms in the present implementation, the present invention is not limited thereto. For example, the apparatus of the invention may be used to detect the tilts and vibration of media having recorded thereon video data in circulation in the market (e.g., CDs (Compact Disks), DVDs (Digital Versatile Disks)). In this case, a laser device is provided to emit a laser beam so as to detect the tilts and vibration. The laser beam from the laser device is made incident on the medium and the laser beam reflected by the medium is received by the PSD 52, and the above-mentioned correction of tilts and the like may be performed based on the analog electric signals from the PSD 52.

===Other Embodiment===

While description has been made of the hologram apparatus according to the present invention and the control of the laser beam made incident on a hologram medium, the above description is provided to facilitate the understanding of the present invention and not intended to limit the present invention. Various changes and alterations can be made to the present invention without departing from spirit and scope of the invention.

<<Position of Beam Reception by PSD>>

Figure 11:
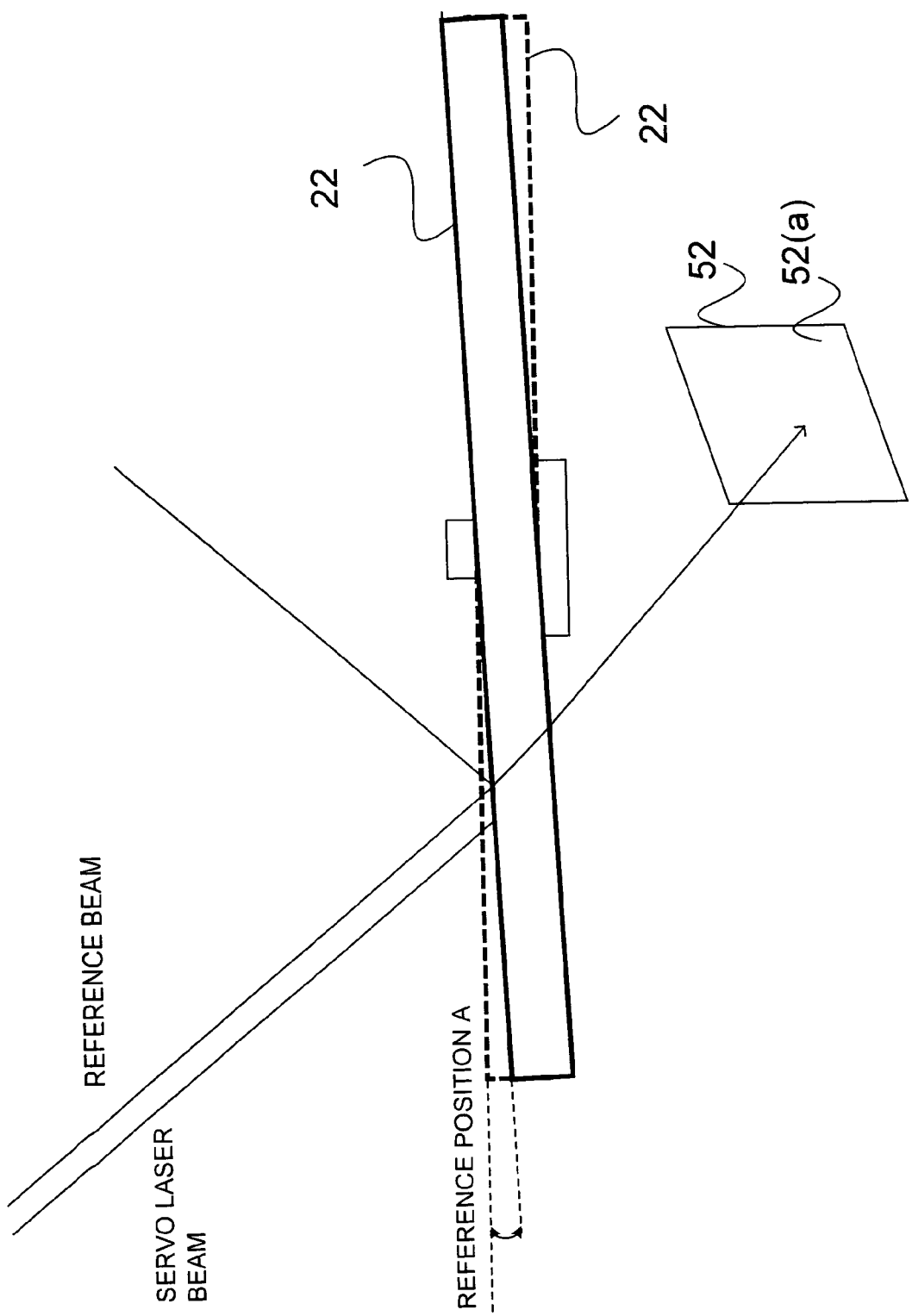
FIG. 11 is a diagram illustrating the servo laser beam having passed through a disk medium and being received by a PSD.

While the PSD 52 receives part of the servo laser beam reflected by the disk medium 22 in the present implementation, the present invention is not limited thereto. FIG. 11 is a diagram showing how the PSD 52 receives the servo laser beam having passed through the disk medium 22. As shown in FIG. 11, when the servo laser beam passes through the disk medium 22, the servo laser beam is refracted by the disk medium 22 of a refractive index. Hence, the position at which the servo laser beam is received when the disk medium 22 is tilted with respect to the reference position A is different from that position when the disk medium 22 is in the reference position A. As a result, the analog electric signals output from the PSD 52 vary in level, and hence it can be determined that the disk medium 22 is tilted. The same applies to the vibration of the disk medium 22.

<<Cutting Off Data Beam and Reference Beam>>

In this implementation, when vibration of no less than a tolerance range in magnitude occurs in the disk medium 22, by closing the first shutter, the irradiation of the data beam and the reference beam onto the disk medium 22 is cut off, but the present invention is not limited thereto.

For recording holograms, for example, a third shutter may be provided in an optical path of the reference beam, and when vibration of no less than a tolerance range in magnitude occurs, the third shutter may cut off the irradiation of the reference beam onto the disk medium 22 and at the same time, the second shutter may cut off the irradiation of the data beam onto the disk medium 22. Or the second shutter may cut off the irradiation of the data beam without the third shutter cutting off the irradiation of the reference beam or vice versa. This is because holograms are interference fringes formed by the data beam and the reference beam interfering as mentioned above. In other words, by cutting off the irradiation of either of the data beam and the reference beam onto the disk medium 22, a hologram, interference fringes, is not formed in the disk medium 22.

For reproducing holograms, the third shutter may be provided to cut off the irradiation of the reference beam onto the disk medium 22.

What is claimed is:

1. A tilt detection apparatus comprising:
   a tilt detection beam generator that makes a tilt detection beam incident in a medium to detect whether the medium is tilted with respect to a reference position;
   a light reception unit that receives the tilt detection beam that after striking the medium, has come from the medium to output a position signal having a level corresponding to a position at which the tilt detection beam is received;
   a reference voltage generating unit that outputs a predetermined reference signal having a level corresponding to a level of the position signal output when the medium is in a reference position; and
   a calculation unit that calculates a difference between the level of the predetermined reference signal and a level of the position signal output during a process of detecting a tilt of the medium and outputs a difference signal to correct a tilt of the medium based on the difference.

2. A hologram apparatus which causes a coherent data beam corresponding to data to be recorded and a coherent recording reference beam to strike a hologram medium so as to record the data in the form of a hologram in the hologram medium, the hologram apparatus comprising:

a tilt detection beam generator that causes a tilt detection beam, incoherent to the data beam and the recording reference beam and to detect whether the hologram medium is tilted with respect to a reference position, to strike the hologram medium;

a light reception unit that receives the tilt detection beam that after striking the medium, has come from the hologram medium to output a position signal having a level corresponding to a position at which the tilt detection beam is received;

a reference voltage generating unit that outputs a predetermined reference signal having a level corresponding to a level of the position signal output when the medium is in a reference position;

a calculation unit that calculates a difference between the level of the predetermined reference signal and a level of the position signal output during a process of detecting a tilt of the medium and outputs a difference signal to correct a tilt of the medium based on the difference; and a correction driver that corrects position of the hologram medium on the basis of the difference signal from the calculation unit.

3. The hologram apparatus according to claim 2, wherein a distance between the light reception unit and the hologram medium is set longer than the shortest distance in terms of a capability of the calculation unit to calculate the difference.

4. The hologram apparatus according to claim 2, wherein the hologram medium is a disk medium and the tilt detection beam generator makes the tilt detection beam incident to a circumferentially peripheral side of a disk surface of the disk medium.

5. The hologram apparatus according to claim 2, wherein the hologram medium is a disk medium and the light reception unit receives the tilt detection beam at a position defined by a first position in a first direction that is a radial direction and a second position in a second direction orthogonal to the first direction, the hologram apparatus comprising:

a first correction output unit that outputs a signal to correct a tilt in the first direction of the disk medium, based on a difference in the first position in the first direction between a position at which the light reception unit receives the tilt detection beam and a position at which the light reception unit is to receive the tilt detection beam when the hologram medium is in the reference position;

a first correction driver that corrects position in the first direction of the disk medium on the basis of the signal from the first correction output unit;

a second correction output unit that outputs a signal to correct a tilt in the second direction of the medium, based on a difference in the second position in the second direction between a position at which the light reception unit receives the tilt detection beam and a position at which the light reception unit is to receive the tilt detection beam when the hologram medium is in the reference position; and a second correction driver that corrects position in the second direction of the disk medium on the basis of the signal from the second correction output unit.

6. The hologram apparatus according to claim 2, wherein the light reception unit receives the tilt detection beam reflected by the hologram medium.

7. The hologram apparatus according to claim 2, wherein the light reception unit receives the tilt detection beam refracted by and having passed through the hologram medium.

8. A hologram apparatus which causes a coherent reproducing reference beam to strike a hologram medium in which data to be reproduced is recorded as a hologram and reproduces the data based on the reproducing reference beam that has been diffracted by the hologram, the hologram apparatus comprising:

a tilt detection beam generator that causes a tilt detection beam, incoherent to the reproducing reference beam and to detect whether the hologram medium is tilted with respect to a reference position, to strike the hologram medium;

a light reception unit that receives the tilt detection beam that after striking the medium, has come from the hologram medium to output a position signal having a level corresponding to a position at which the tilt detection beam is received;

a reference voltage generating unit that outputs a predetermined reference signal having a level corresponding to a level of the position signal output when the medium is in a reference position; and a calculation unit that calculates a difference between the level of the predetermined reference signal and a level of the position signal output during a process of detecting a tilt of the medium and outputs a difference signal to correct a tilt of the medium based on the difference; and a correction driver that corrects position of the hologram medium on the basis of the difference signal from the calculation unit.

9. A hologram apparatus which causes a coherent data beam corresponding to data to be recorded and a coherent recording reference beam to strike a hologram medium so as to record the data in the form of a hologram in the hologram medium, the hologram apparatus comprising:

a tilt detection beam generator that causes a tilt detection beam, incoherent to the data beam and the recording reference beam and to detect whether the hologram medium is tilted with respect to a reference position, to strike the hologram medium;

a light reception unit that receives the tilt detection beam that after striking the medium, has come from the hologram medium to output a position signal having a level corresponding to a position at which the tilt detection beam is received;

a correction output unit that outputs a difference signal to correct a tilt of the hologram medium, based on a difference between a level of the position signal output from the light reception unit when the medium is in the reference position and a level of the position signal output from the light reception unit during a process in which the data is recorded in the hologram medium;

a correction driver that corrects position of the hologram medium on the basis of the difference signal from the correction output unit;

a vibration calculation unit that calculates a vibration amount of at least one of the hologram medium and the tilt detection beam generator based on the difference in light reception position on the light reception unit between a position at which the light reception unit receives the tilt detection beam and a position at which the light reception unit is to receive the tilt detection beam when the hologram medium is in the reference position;

a vibration determination unit that determines whether the vibration amount calculated by the vibration calculation unit is less than a given vibration amount; and an interruption unit that cuts off irradiation of at least one of the data beam and the recording reference beam into the hologram medium on the basis of the determination result of the vibration determination unit indicating that the vibration amount calculated by the vibration calculation unit is at the given or greater vibration amount.

10. A hologram apparatus which causes a coherent reproducing reference beam to strike a hologram medium in which data to be reproduced is recorded as a hologram and reproduces the data based on the reproducing reference beam that has been diffracted by the hologram, the hologram apparatus comprising:

a tilt detection beam generator that causes a tilt detection beam, incoherent to the reproducing reference beam and to detect whether the hologram medium is tilted with respect to a reference position, to strike the hologram medium;

a light reception unit that receives the tilt detection beam that after striking the medium, has come from the hologram medium to output a position signal having a level corresponding to a position at which the tilt detection beam is received;

a correction output unit that outputs a difference signal to correct a tilt of the hologram medium, based on a difference between a level of the position signal output from the light reception unit when the medium is in the reference position and a level of the position signal output from the light reception unit during a process in which the data is reproduced;

a correction driver that corrects position of the hologram medium on the basis of the difference signal from the correction output unit;

a vibration calculation unit that calculates a vibration amount of at least one of the hologram medium and the tilt detection beam generator based on the difference in light reception position on the light reception unit between a position at which the light reception unit receives the tilt detection beam and a position at which the light reception unit is to receive the tilt detection beam when the hologram medium is in the reference position;

a vibration determination unit that determines whether the vibration amount calculated by the vibration calculation unit is less than a given vibration amount; and an interruption unit that cuts off irradiation of the reproducing reference beam into the hologram medium on the basis of the determination result of the vibration determination unit indicating that the vibration amount calculated by the vibration calculation unit is at the given or greater vibration amount.

11. A tilt correction method for a medium comprising:

making a tilt detection beam incident in a medium to detect whether the medium is tilted with respect to a reference position;

receiving the tilt detection beam that, after striking the medium, has come from the medium to output a position signal having a level corresponding to a position at which the tilt detection beam is received;

outputting a predetermined reference signal having a level corresponding to a level of the position signal output when the medium is in a reference position;

calculating a difference between the level of the predetermined reference signal and a level of the position signal output during a process of detecting a tilt of the medium; and outputting a difference signal to correct a tilt of the medium based on the difference.

12. A tilt correction method for a hologram medium by a hologram apparatus which causes a coherent data beam corresponding to data to be recorded and a coherent recording reference beam to strike a hologram medium so as to record the data in the form of a hologram in the hologram medium, the method comprising:

causing a tilt detection beam, incoherent to the data beam and the recording reference beam and to detect whether the hologram medium is tilted with respect to a reference position, to strike the hologram medium;

receiving the tilt detection beam that, after striking the medium, has come from the hologram medium to output a position signal having a level corresponding to a position at which the tilt detection beam is received;

outputting a predetermined reference signal having a level corresponding to a level of the position signal output when the medium is in a reference position;

calculating a difference between the level of the predetermined reference signal and a level of the position signal output during a process of detecting a tilt of the medium;

outputting a difference signal to correct a tilt of the medium based on the difference; and correcting position of the hologram medium on the basis of the difference signal.

13. A tilt correction method for a hologram medium by a hologram apparatus which causes a coherent reproducing reference beam to strike a hologram medium in which data to be reproduced is recorded as a hologram and reproduces the data based on the reproducing reference beam that has been diffracted by the hologram, the method comprising:

causing a tilt detection beam, incoherent to the reproducing reference beam and to detect whether the hologram medium is tilted with respect to a reference position, to strike the hologram medium;

receiving the tilt detection beam that after striking the medium, has come from the hologram medium to output a position signal having a level corresponding to a position at which the tilt detection beam is received;

outputting a predetermined reference signal having a level corresponding to a level of the position signal output when the medium is in a reference position;

calculating a difference between the level of the predetermined reference signal and a level of the position signal output during a process of detecting a tilt of the medium;

outputting a difference signal to correct a tilt of the medium based on the difference; and correcting position of the hologram medium on the basis of the difference signal.

\* \* \* \* \*